United States Patent [19]

Inoue et al.

[11] Patent Number: 5,241,478
[45] Date of Patent: Aug. 31, 1993

[54] AUTOMOTIVE TRACTION CONTROL SYSTEM

[75] Inventors: Naoki Inoue, Chiba; Toshimitsu Takaishi, Saitama; Takayuki Konuma, Saitama; Shinichi Maeda, Saitama; Katsutoshi Yamazaki, Saitama; Seiji Onozawa, Tokyo, all of Japan

[73] Assignee: Honda Giken Kogyo Kabushiki Kaisha, Tokyo, Japan

[21] Appl. No.: 838,113

[22] Filed: Feb. 20, 1992

[30] Foreign Application Priority Data

Feb. 20, 1991 [JP] Japan ................................. 3-045612
Oct. 25, 1991 [JP] Japan ................................. 3-306495

[51] Int. Cl.⁵ ............................................. B60K 28/16
[52] U.S. Cl. ............................. 364/426.02; 364/426.03; 180/197; 123/333
[58] Field of Search ....................... 364/426.02, 426.03; 180/197; 123/333, 481, 493

[56] References Cited

U.S. PATENT DOCUMENTS

| | | | |
|---|---|---|---|
| 5,018,383 | 5/1991 | Togai et al. | 180/197 |
| 5,038,883 | 8/1991 | Kushi et al. | 180/197 |
| 5,065,834 | 11/1991 | Hirabayashi et al. | 180/197 |
| 5,067,579 | 11/1991 | Kushi et al. | 180/197 |
| 5,073,865 | 12/1991 | Togai et al. | 364/426.02 |
| 5,099,942 | 3/1992 | Kushi et al. | 123/333 |
| 5,148,884 | 9/1992 | Tsuyama et al. | 364/426.03 |

FOREIGN PATENT DOCUMENTS 63-20253 1/1988 Japan.

Primary Examiner—Gary Chin

[57] ABSTRACT

The current ignition delay angle is increased gradually until the delay angle reaches a maximum delay angle stored in a maximum delay angle storage unit when the failure of a traction control unit is detected by a failure detecting member while a switching member is set so as to select the output of a traction control mode ignition angle calculating device. A failure control mode ignition angle calculating device calculates an ignition angle on the basis of the increased delay angle and a standard ignition angle. In case failure occurs in the traction control system during traction control operation, ignition delay angle is increased gradually to reduce the running speed of the vehicle gradually regardless of the opening of the throttle valve. Accordingly, the vehicle is not subjected to shocks attributable to the change of control mode when failure occurs in the traction control system.

10 Claims, 27 Drawing Sheets

AUTOMOTIVE TRACTION CONTROL SYSTEM

BACKGROUND OF THE INVENTION

1. Field of the Invention

The present invention relates to an automotive traction control system and, more particularly, to an automotive traction control system capable of preventing the excessive slip of the vehicle in starting or accelerating the vehicle on a slippery road.

2. Description of Background Art

An automotive traction control system has previously been proposed to prevent the excessive slip of a vehicle by detecting a slip level on the basis of the respective rotating speeds of the driving wheel and the free wheel of the vehicle and suppressing the traction of the vehicle by regulating ignition timing and throttle opening. Such an automotive traction control system is disclosed in, for example, Japanese Patent Laid-open (Kokai) No. Sho 63-20253.

In case failure occurs in this known automotive traction control system during traction control operation, the automotive traction control system restores a normal running state.

If failure occurs in the traction control unit of the automotive traction control system while the traction is decreased to a relatively low extent, the vehicle may undergo a shock because the relatively low traction is increased instantly to the normal traction.

SUMMARY AND OBJECTS OF THE INVENTION

The present invention has been made to solve such a problem, and it is, therefore, an object of the present invention to provide an automotive traction control system that may not cause a shock to act upon the vehicle even if its traction control unit fails to operate properly.

To solve the foregoing problem, in a first aspect of the present invention, an automotive traction control system for controlling the traction of a vehicle by regulating ignition timing is characterized in gradually increasing ignition delay angle and calculating an ignition angle on the basis of the ignition delay angle if the traction control unit thereof fails to operate properly during traction control operation.

In a second aspect of the present invention, an automotive traction control system is characterized in actuating a failure display if the traction control unit thereof fails to operate properly during traction control operation.

In a third aspect of the present invention, an automotive traction control system is characterized in increasing the ignition delay angle to a maximum ignition delay angle corresponding to engine speed.

In a fourth aspect of the present invention, an automotive traction control system is characterized in decreasing the ignition delay angle after the ignition delay angle has been increased to the maximum ignition delay angle.

The running speed of the vehicle decreases regardless of the opening of the throttle valve when the ignition delay angle is increased gradually.

The running speed of the vehicle increases gradually when the ignition delay angle is decreased gradually after the ignition delay angle has been increased to the maximum ignition delay angle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will be described herein after with reference to the accompanying drawings.

Figure 3:
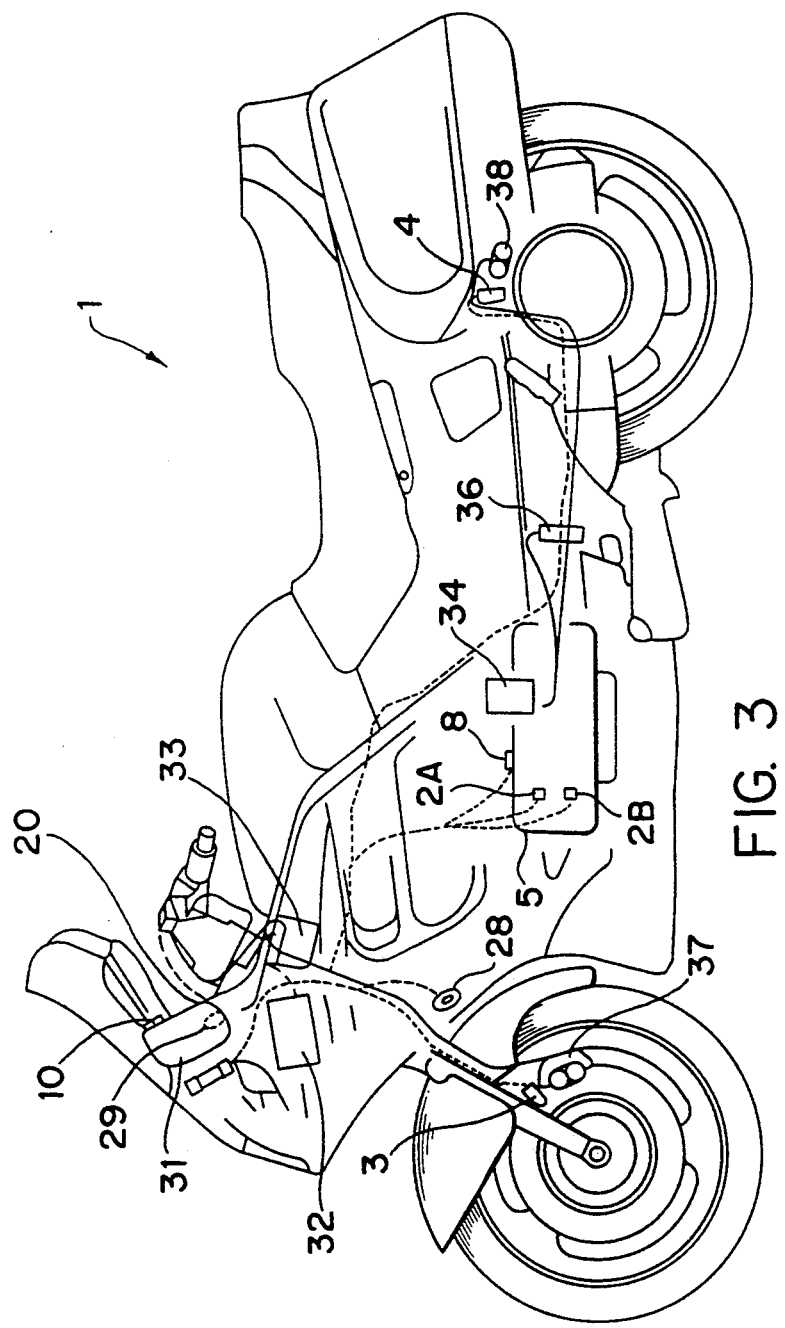
FIG. 3 is a side elevation of a motorcycle provided with an automotive traction control system in a preferred embodiment according to the present invention.
Figure 4:
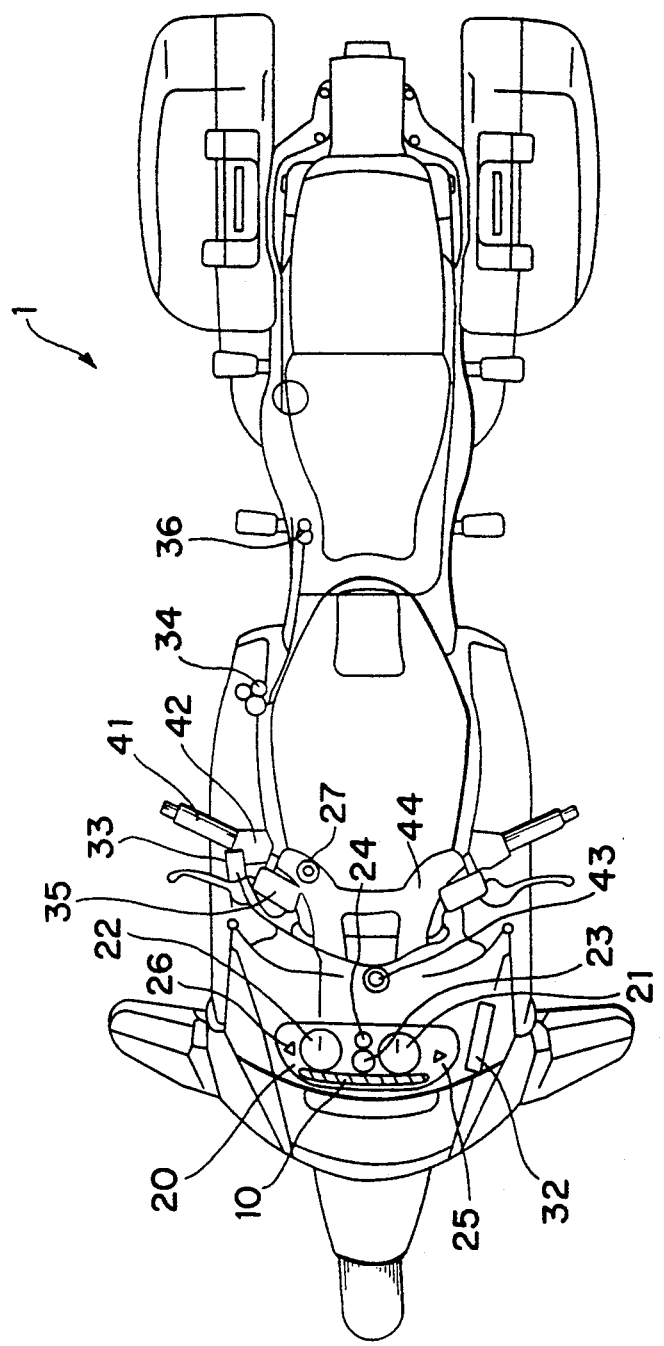
FIG. 4 is a plan view of the motorcycle of FIG. 3.

FIG. 3 is a side view of a motorcycle incorporating an automotive traction control system in a preferred embodiment according to the present invention, and FIG. 4 is a plan view of the motorcycle of FIG. 3. In FIGS. 3 and 4, like parts are denoted by the same reference characters.

Referring to FIGS. 3 and 4, a motorcycle 1 has an engine 5 provided with a first pulse generator 2A and a second pulse generator 2B for detecting engine speed. The first pulse generator 2A generates a pulse signal PC1 every time the crankshaft of the engine 5 turns through a predetermined angle, and the second pulse generator 2B generates a pulse signal PC2 when the crankshaft of the engine 5 is at a predetermined angle.

The front wheel, free wheel, and the rear wheel, driving wheel, of the motorcycle 1 are provided respectively with a front wheel speed sensor 3 and a rear wheel speed sensor 4 for detecting the rotating speeds of the corresponding wheels. The front wheel speed sensor 3 and the rear wheel speed sensor 4 generate a pulse signal every time the corresponding wheels turn through a predetermined angle.

Figure 6:
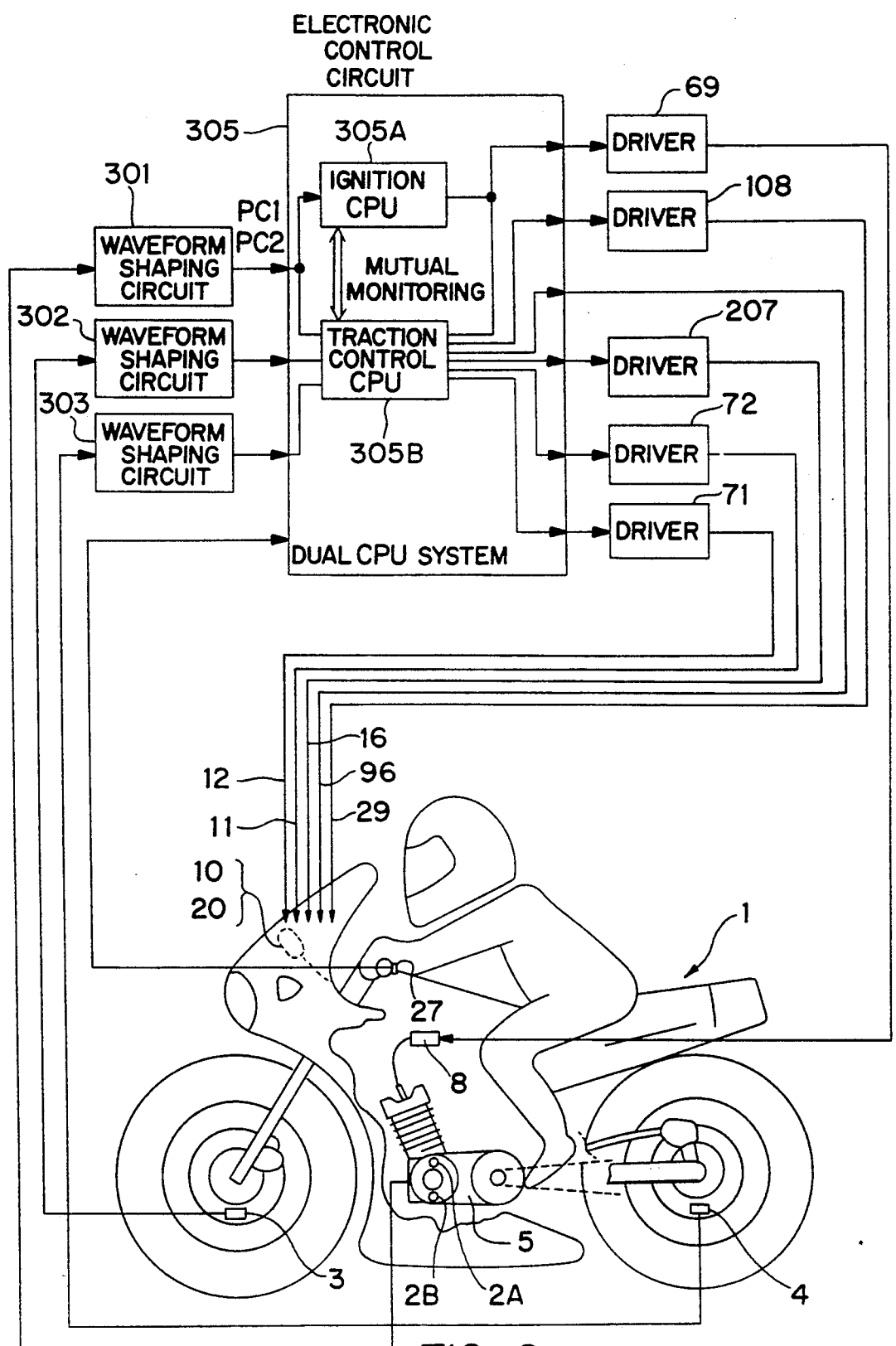
FIG. 6 is a block diagram of an automotive traction control system in a preferred embodiment according to the present invention.

An ignition control ECU 31 is provided on the reverse side of a meter panel 20, namely, the side of the meter panel 20 opposite to the side of the same on which meters are arranged. The ignition control ECU 31 controls timing for operating an ignition coil (ignition angle) on the basis of engine speed Ne determined on the basis of pulse signals generated by the first pulse generator 2A and the second pulse generator 2B, and the output signals of the front wheel speed sensor 3 and the rear wheel speed sensor 4. The ignition control ECU 31, the operation of which will be described in detail later with reference to FIG. 6, is provided with an electronic control circuit 305 including an ignition control CPU 305A (FIG. 6) for calculating a standard ignition angle, and a traction control CPU 305B (FIG. 6) for calculating a traction control mode ignition angle to control the slip of the wheel mainly during acceleration.

An ALB ECU 32 controls the braking action of a front brake caliper 37 and a rear brake caliper 38 when the slip ratio or slip of the motor cycle exceeds a predetermined level in braking the motor cycle, which has no direct relation with the present invention. Also shown in FIGS. 3 and 4 are a front modulator 33, a rear modulator 34, a front brake master cylinder 35 and a rear brake master cylinder 36 for carrying out the foregoing control operation.

As shown in FIG. 4, a speed meter 21, a tachometer 22, a fuel meter 23, a temperature gage 24, a left turn pilot lamp 25 and a right turn pilot lamp 26 are arranged on the meter panel 20. An indicator panel 10 is placed in the upper part of the meter panel 20.

Figure 5:
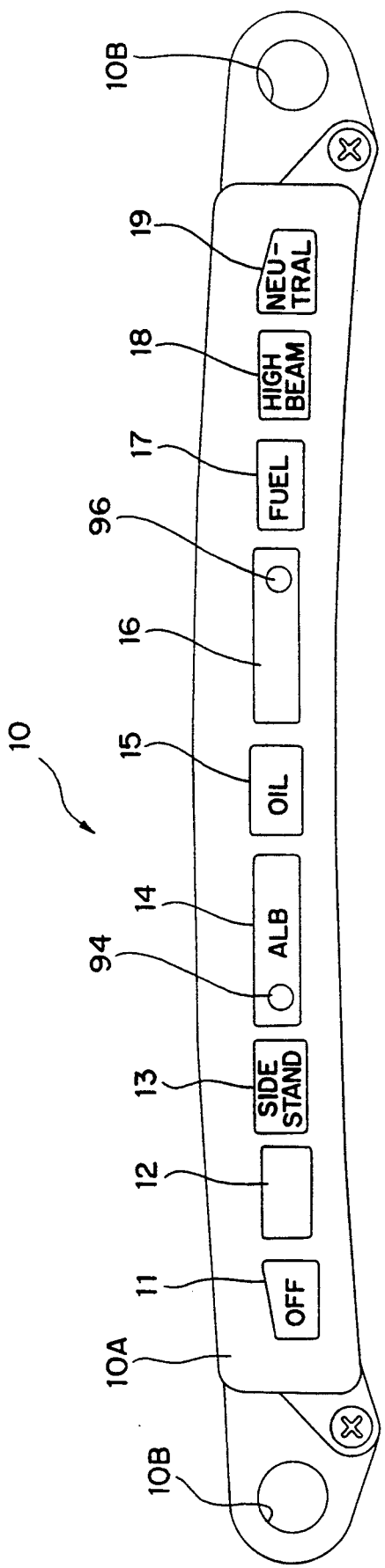
FIG. 5 is a plan view of an indicator panel.

FIG. 5 is a plan view of the indicator panel 10, showing the details of the indicator panel. Referring to FIG. 5, a traction control cancellation pilot lamp 11, a traction control mode pilot lamp 12, a side stand alarm lamp 13, ALB failure pilot lamp 14 and ALB failure LED 94 for indicating the failure of the ALB ECU 32 which executes brake control (ALB) operation, an oil alarm lamp 15 for indicating the exhaustion of oil to a critical level, a traction control failure pilot lamp 16 and a traction control failure LED 96 for indicating the failure of a traction control unit, a fuel warning lamp 17 for warning fuel exhaustion, a high-beam pilot lamp 18 for indicating the headlight being set for high-beam focus, and a neutral pilot lamp 19 for indicating the transmission of the engine being set in a neutral position are arranged on a frame 10A.

The lamps 11, 12 and 13 are orange lamps, the lamps 14 to 17 are red lamps, the LEDs 94 and 96 are red LEDs, the lamp 18 is a blue lamp and the lamp 19 is a green lamp. The indicator panel 10 is provided with through holes 10B to receive screws for fastening the indicator panel 10.

Referring to FIGS. 3 and 4 again, the motorcycle is provided with a horn 28, an alarm buzzer 29, a cancellation switch 27 for cancelling the operation of the traction control unit, a throttle control grip 41, a switch case 42, an ignition switch 43 and a handle cover 44.

FIG. 6 is a block diagram of the automotive traction control system embodying the present invention, in which parts like or corresponding to those described with reference to FIGS. 3 and 4 are denoted by the same reference characters, and the description thereof will be omitted to avoid duplication.

Signals provided by the first pulse generator 2A, the second pulse generator 2B, the front wheel speed sensor 3 and the rear wheel speed sensor 4 are given through waveform shaping circuits 301 to 303, respectively, to an electronic control circuit 305.

The electronic control circuit 305 is of a so-called dual CPU system comprising the ignition control CPU 305A and a traction control CPU 305B. The CPUs 305A and 305B monitor each other. In flow charts shown in the accompanying drawings, the respective operations of the ignition control CPU 305A and the traction control CPU 305B are shown in combination. In principle, the ignition control CPU 305A calculates a standard ignition angle, and the traction control CPU 305B calculates a traction control mode ignition angle and other items of control information.

Figure 28:
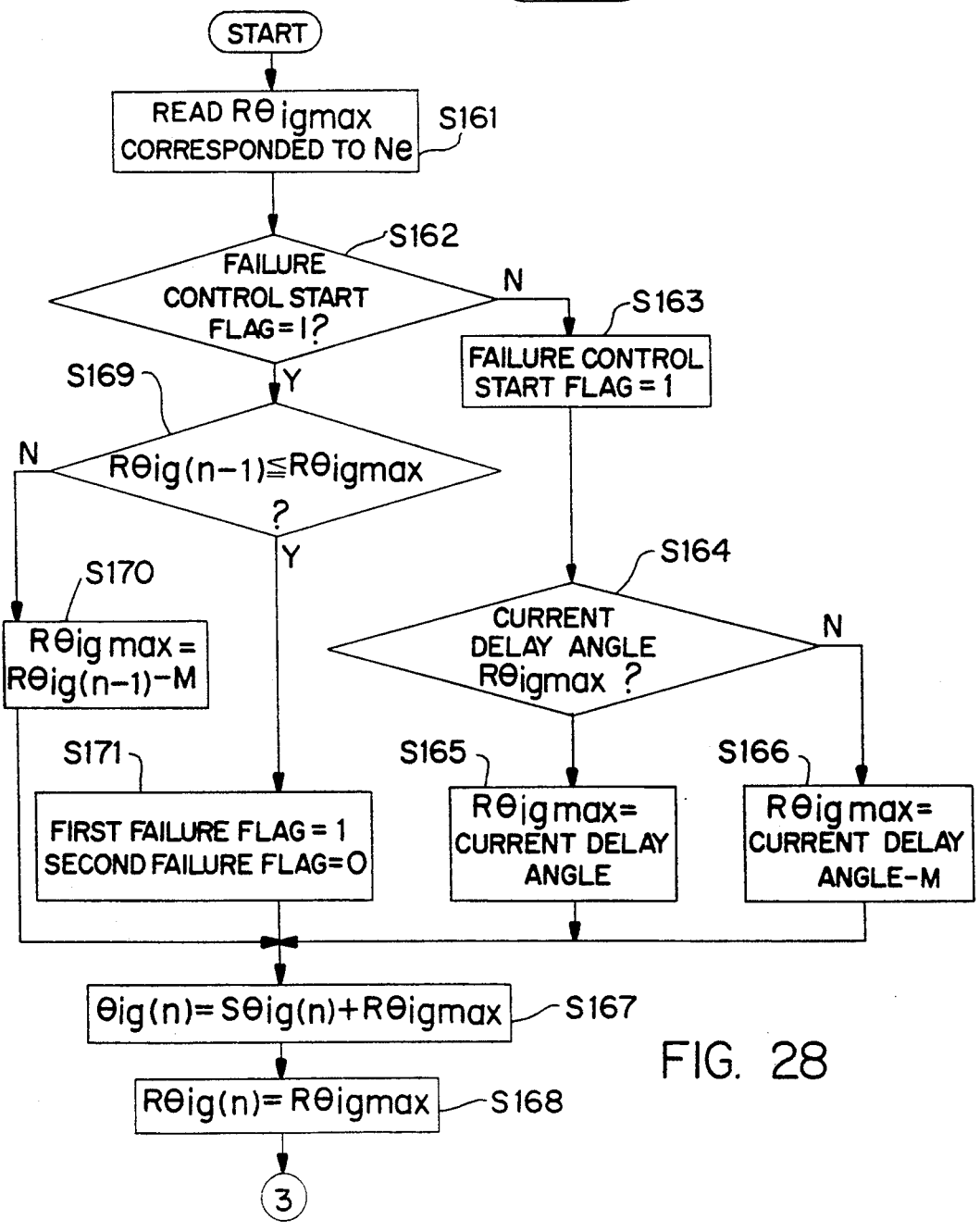
FIG. 28 is a flow chart of a subroutine to be executed in step S23.
Figure 38:
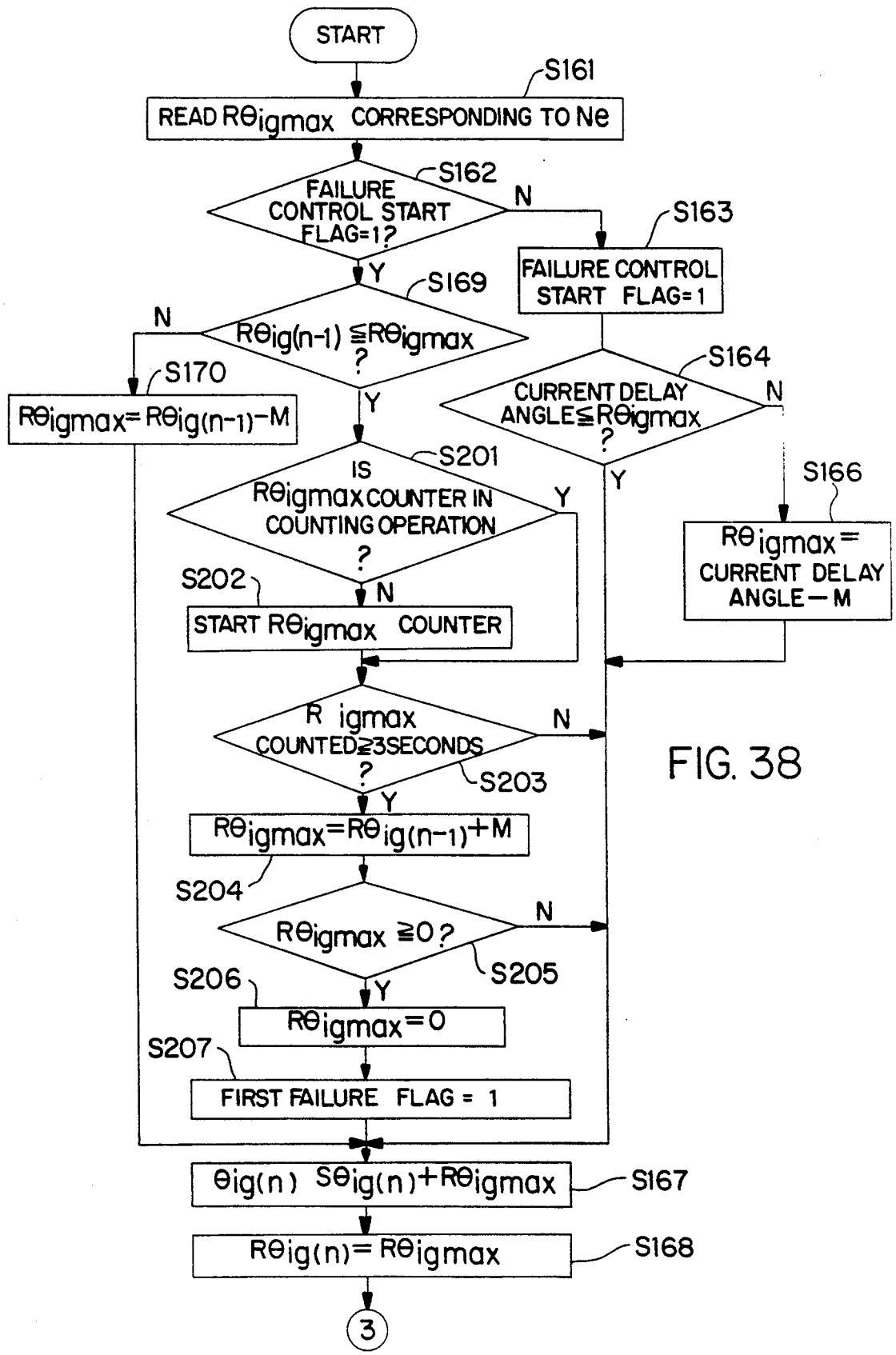
FIG. 38 is a flow chart of another subroutine to be executed in step S23.

Conditions for selecting either the standard ignition angle or the traction control mode ignition angle are examined by the CPU 305A and/or the CPU 305B. If failure occurs in the traction control CPU 305B or the traction control CPU 305B fails to operate properly, the ignition control CPU 305A carries out the rest of the control operation, such as shown in FIGS. 28 or 38.

The electronic control circuit 305 is provided with components of a microcomputer, such as a ROM, a RAM and an interface, in addition to the CPUs 305A and 305B. The electronic control circuits 305 operates the input signals to calculate ignition angles $\Theta_{ig}$ ($S\Theta_{(n)}$, $C\Theta_{ig(n)}$ and $\Theta_{ig(n)}$) and gives the result of calculation to an ignition control unit 69. Thus, the ignition coil 8 is controlled according to the slipping condition of the motor cycle.

The cancellation switch 27 for cancelling a traction control mode is connected to the electronic control circuit 305. The electronic control circuit 305 turns on the traction control mode pilot lamp 12 provided on the meter panel 20 when the traction control mode is selected.

The traction control cancellation pilot lamp 11 and the failure pilot lamp 16 provided on the indicator panel 10 are connected through drivers 72 and 207, respectively, to the electronic control circuit 305. The traction control failure LED 96 is connected directly to the electronic control circuit 305. The warning buzzer 29 provided on the meter panel 20 is connected through a driver 108 to the electronic control circuit 305.

If necessary, the electronic control circuit controls other operations for the motorcycle 1 including fuel injection control, exhaust control, automatic transmission gear ratio control, brake control for deceleration and light distribution control for the headlight.

Figure 7:
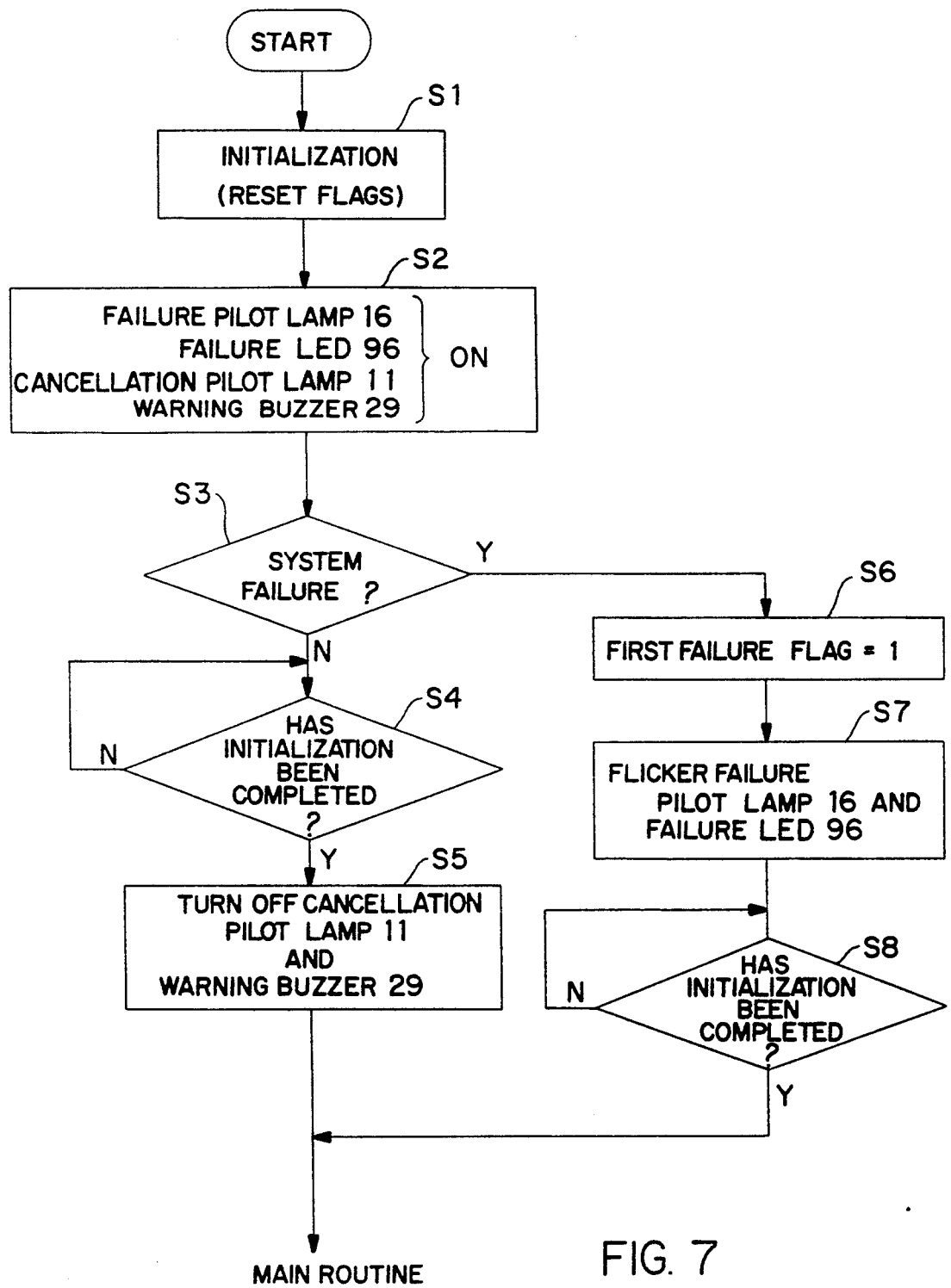
FIG. 7 is a flow chart of a procedure to be executed when the ignition switch of the motorcycle is closed.

The operation of the ignition control ECU 31 will be described hereinafter. FIG. 7 is a flow chart of a procedure to be executed when the ignition switch of the motorcycle is closed.

In step S1, flags are reset to initialize the ignition control ECU 31. In step S2, the failure pilot lamp 16, the failure LED 96 and the traction control cancellation lamp 11 are turned on, and the warning buzzer 29 is energized and generates a sound of a predetermined sound volume.

In step S3, a query is made to see if the traction control CPU 305B of the ignition control ECU 31 in a failed state or the traction control CPU 305B is unable to execute traction control due to the disconnection of the front wheel speed sensor 3 and/or the rear wheel speed sensor 4. As mentioned above, if the traction control CPU 305B is in a failed state, the ignition control CPU 305A executes the remaining steps.

In the normal running state, the automotive traction control system employs the standard ignition angle $S\Theta_{ig(n)}$ for ignition timing control, and employs the traction control mode ignition angle $C\Theta_{ig(n)}$ (and $C\text{-}S\Theta_{ig(n)}$) for traction control when predetermined conditions are met. The ignition control CPU calculates the standard ignition angle $S\Theta_{ig(n)}$, and the traction control CPU calculates the ignition angle $C\Theta_{ig(n)}$ (and $C\text{-}S\Theta_{ig(n)}$). If failure occurs in the traction control CPU, the front wheel speed sensor 3 or the rear wheel speed sensor 4 when the ignition switch is closed or when the standard ignition angle is employed for ignition time control, a first failure flag is set to the 1 state and the ignition control CPU uses only the standard ignition angle $S\Theta_{ig(n)}$ for ignition control. If the foregoing failure occurs during traction control using the ignition angle $C\Theta_{ig(n)}$ (and $C\text{-}S\Theta_{ig(n)}$), a second failure flag is set to the 1 state, and the ignition control CPU executes step S23 in FIG. 8, i.e., a traction control failure control procedure S23 shown in FIG. 28.

If the response in step S3 is negative, namely, when no failure occurred, a query is made in step S4 to see if initialization has been completed. When the response in step S4 is affirmative, the traction control cancellation pilot lamp 11 is turned off and the warning buzzer 29 is stopped.

If the response in step S3 is affirmative, the first failure flag 1 is set to the 1 state in step S6, and current is supplied intermittently to the traction control failure pilot lamp 16 and the traction control failure LED 96 in step S7 for flickering. In step S8, a query is made to see if initialization has been completed. After step S5 or step S7 has been executed, a main routing shown in FIGS. 8 and 10 are started.

Figure 8:
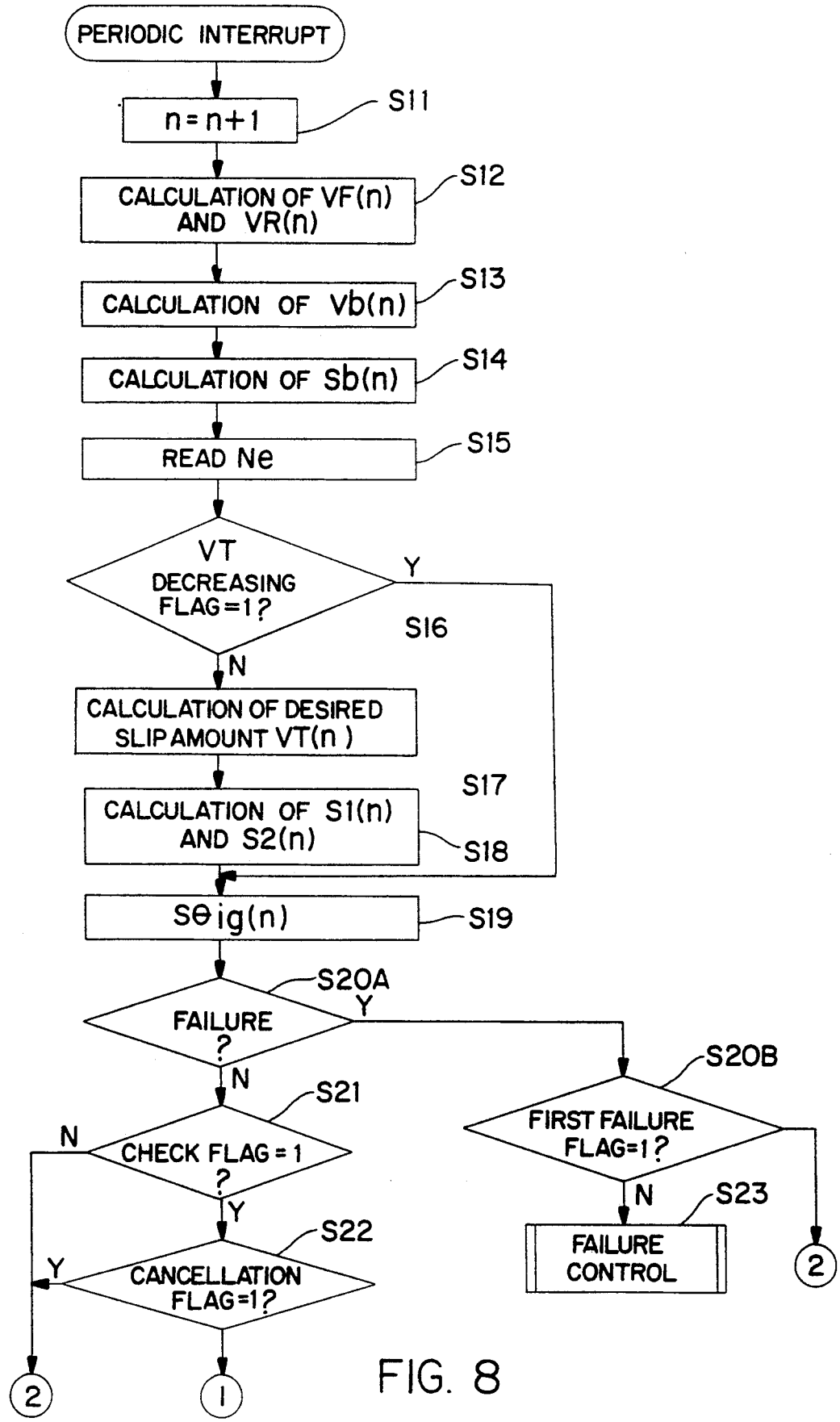
FIG. 8 is a flow chart of a main routine to be executed by an automotive traction control system in a preferred embodiment according to the present invention.
Figure 9:
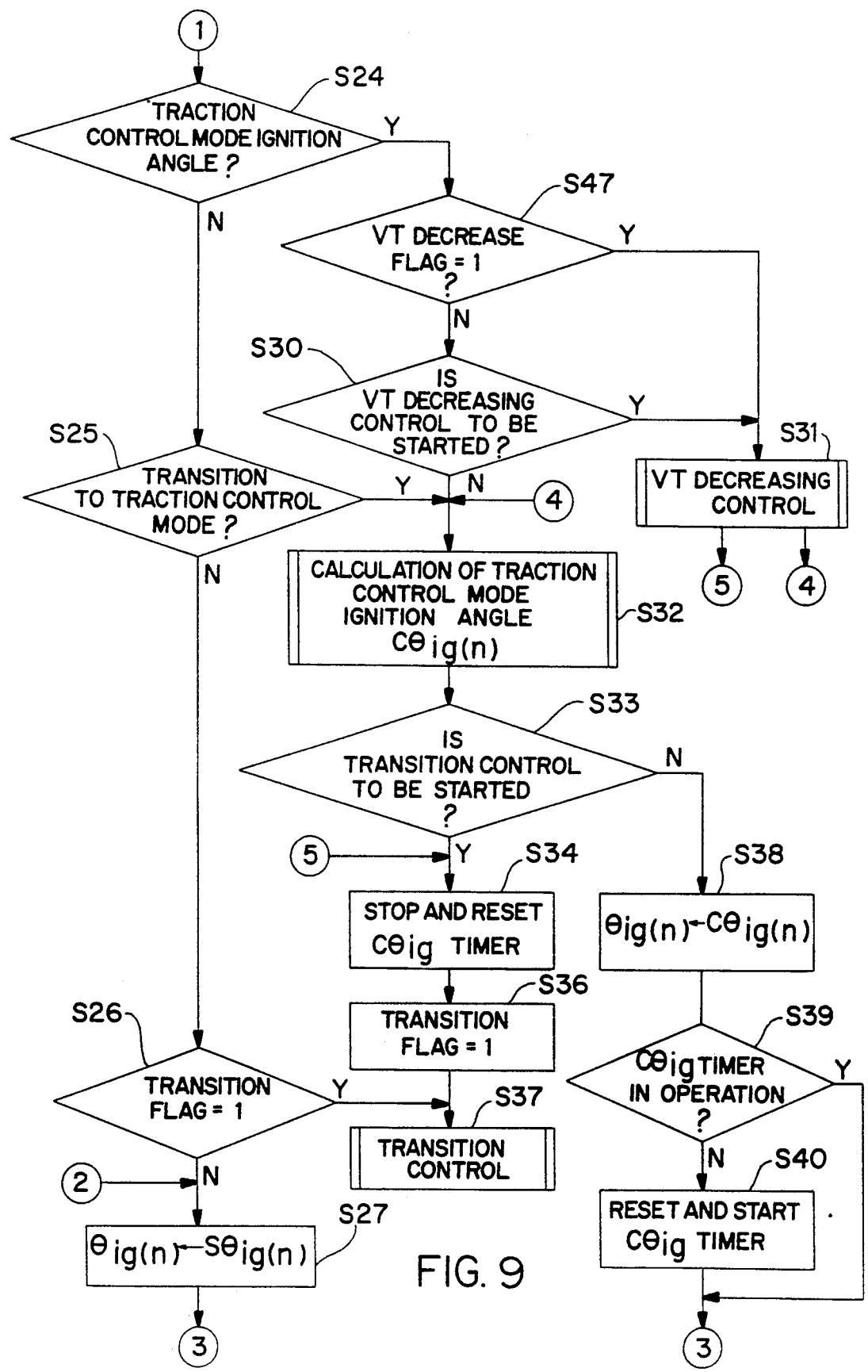
FIG. 9 is a flow chart of a main routine to be executed by an automotive traction control system in a preferred embodiment according to the present invention.
Figure 10:
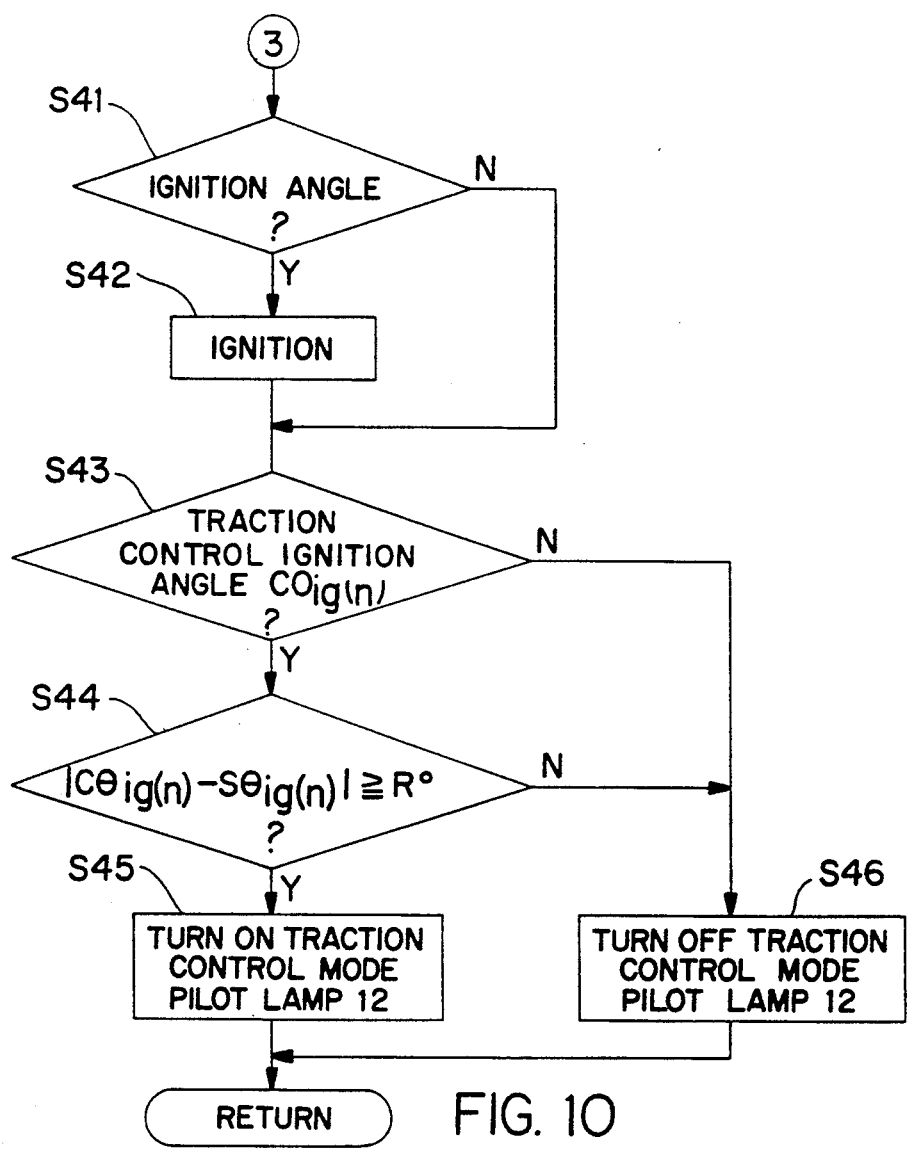
FIG. 10 is a flow chart of a main routine to be executed by an automotive traction control system in a preferred embodiment according to the present invention.

FIGS. 8 to 10 show flow charts of the main routine to be executed by the automotive traction control system embodying the present invention at regular time intervals. In step S11, n which is reset to zero by initialization is incremented by 1.

Figure 11:
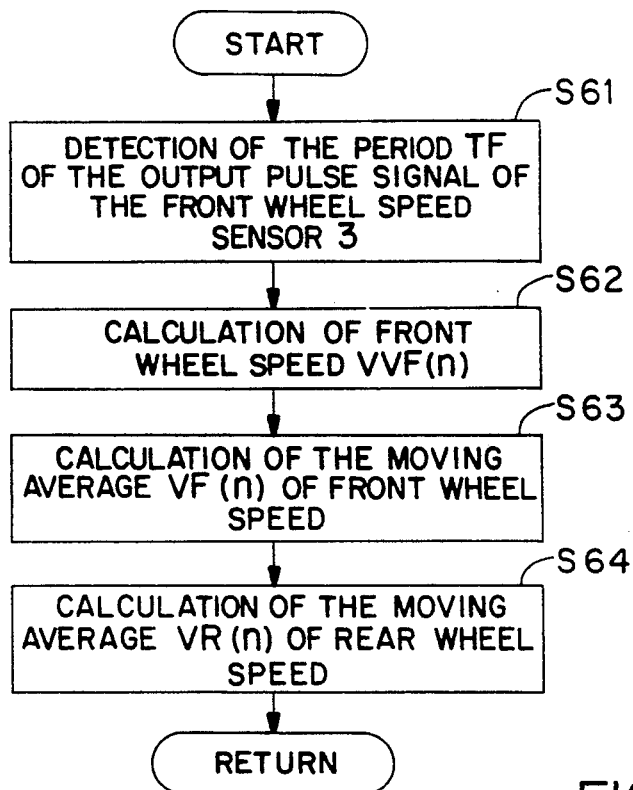
FIG. 11 is a flow chart of a subroutine to be executed in step S12.

In step S12, a wheel speed calculating routine shown in FIG. 11 is executed to calculate the moving average front wheel speed (hereinafter referred to as "front wheel speed") VF(n) and the moving average rear wheel speed (hereinafter referred to as "rear wheel speed") VR(n) are calculated on the basis of the output signals of the front wheel speed sensor 3 and the rear wheel speed sensor 4.

Figure 12:
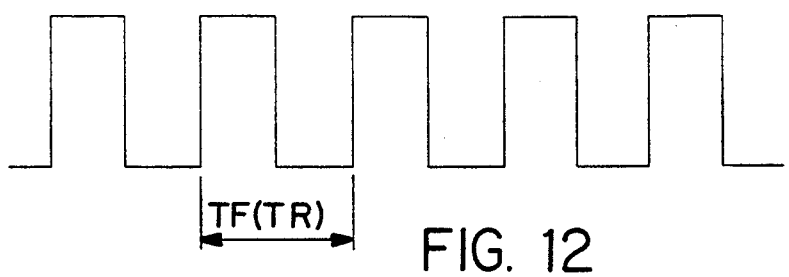
FIG. 12 is a diagram showing the waveform of the output pulse signals of a front wheel speed sensor and a rear wheel speed sensor.

Referring to FIG. 11, the period TF of the output pulses of the front wheel speed sensor 3 is detected in step S61. FIG. 12 shows the output pulse signals of the front wheel speed sensor 3 and the rear wheel speed sensor 4. In FIG. 12, indicated at TF (TR) is the period of the output pulses of the front wheel speed sensor 3 (the rear wheel speed sensor 4).

In step S62, a front wheel speed VVF(n) in this control cycle is calculated by using an expression (1).

$$VVF(n) = KF/TF \qquad (1)$$

where KF is a constant.

In step S63, the moving average front wheel speed (front wheel speed) VF(n) is calculated on the basis of the preceding m pieces of front wheel speed VVF(n) by using an expression (2).

$$VF(n) = (VVF(n) + VVF(n-1) + \ldots + VVF(n-m+1))/m \qquad (2)$$

where m is a positive integral number.

In step S64, the moving average rear wheel speed (rear wheel speed) VR(n) is calculated by the same steps as steps S61 to S63.

Referring to FIG. 8 again, in step S13, an actual slip Vb(n) of the motorcycle is calculated by using an expression (3).

$$Vb(n) = VR(n) - VF(n) \quad (3)$$

If the front wheel is the driving wheel, and the rear wheel is the free wheel, VF(n) and VR(n) are interchanged.

In step S14, an actual slip ratio Sb(n) of the motorcycle is calculated by using an expression (4).

$$Sb(n) = VB(n)/VR(n) \quad (4)$$

The slip ratio Sb(n) is in the range of 0 to 1.

In step S15, engine speed Ne calculated by a known method on the basis of the pulse signals PC1 and PC2 is read.

In step S16, a query is made to see if a VT decrease flag, which is set to the 1 state when the VT decrease control is start, is in the 1 state. The routine goes to step S19 if the response in step S16 is affirmative, or goes to step S17 if the response in step S16 is negative.

Figure 13:
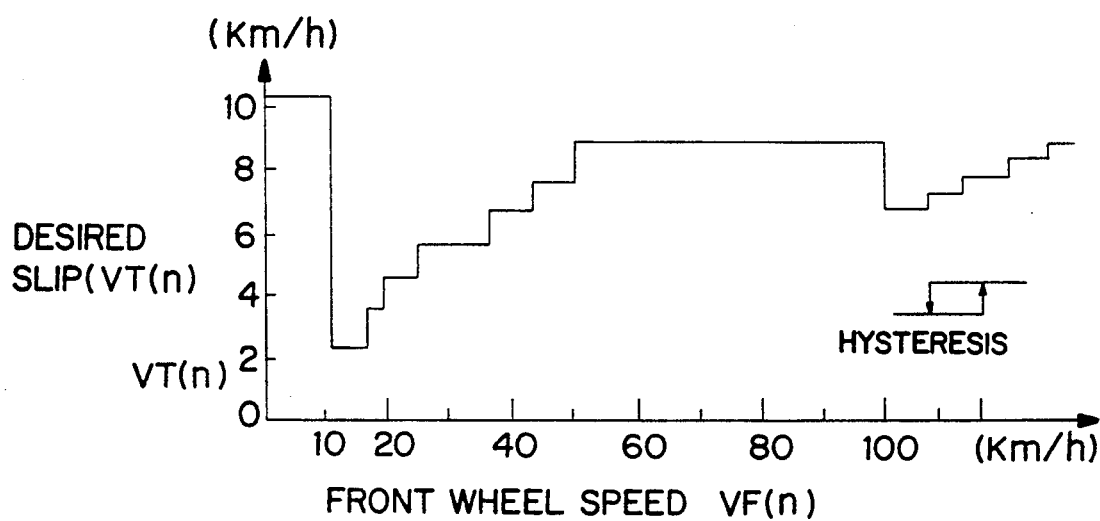
FIG. 13 is a graph showing the relation between desire slip VT(n) and front wheel speed VF(n)

In step S17, a desired slip VT(n) for traction control is determined. A desired slip VT(n) corresponding to the calculated front wheel speed VF(n) is read from, for example, a table as shown in FIG. 13 which has been previously stored in a storage. The table shown in FIG. 13 has hysteresis so that the value of the desired slip VT(n) while the front wheel speed VF(n) is decreasing is greater than that of VT(n) while the front wheel speed VF(n) is increasing.

In step S18, a traction control mode ignition timing control starting slip ratio (criterional slip ratio) S1(n), namely, a boundary condition for terminating standard ignition timing control and starting traction control mode ignition timing control, and a traction control mode ignition timing control terminating slip ratio S2(n), namely, a boundary condition for terminating the traction control mode ignition timing control and starting the standard ignition timing control, are calculated.

Figure 14:
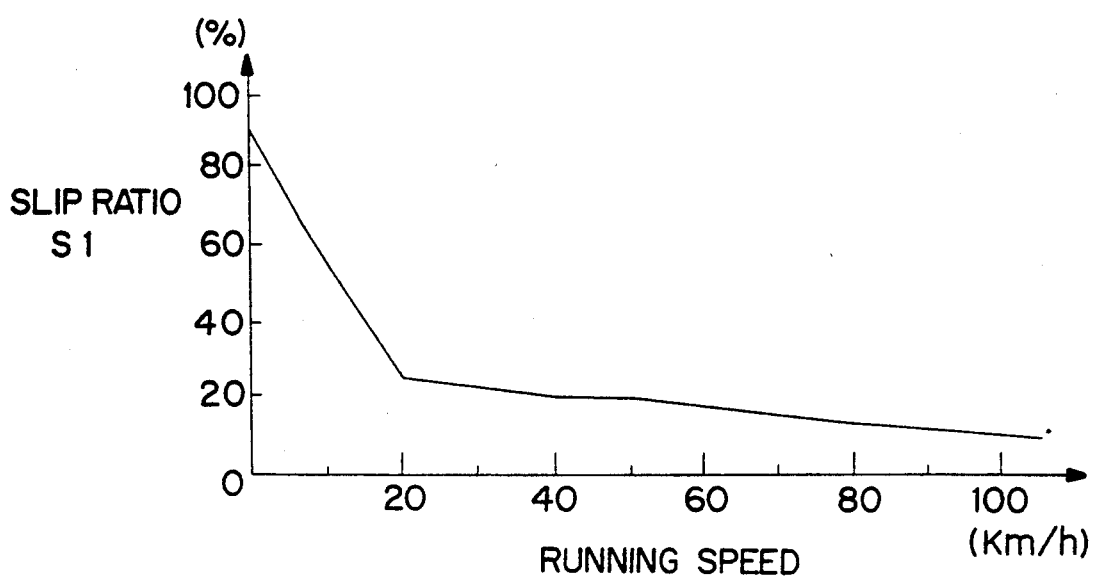
FIG. 14 is a graph showing the relation between slip ratio S1 and running speed.

A slip ratio S1(n) corresponding to the running speed of the vehicle (or the front wheel speed) is read from, for example, a table as shown in FIG. 14 which has been previously stored in a storage. As shown in FIG. 14, the slip ratio S1(n) decreases with the decrease f in the running speed.

The slip ratio S2(n) may be read, similarly to the slip ratio S1(n), from a table or may be a fixed value, for example, 7%, regardless of the running speed of the vehicle.

Figure 15:
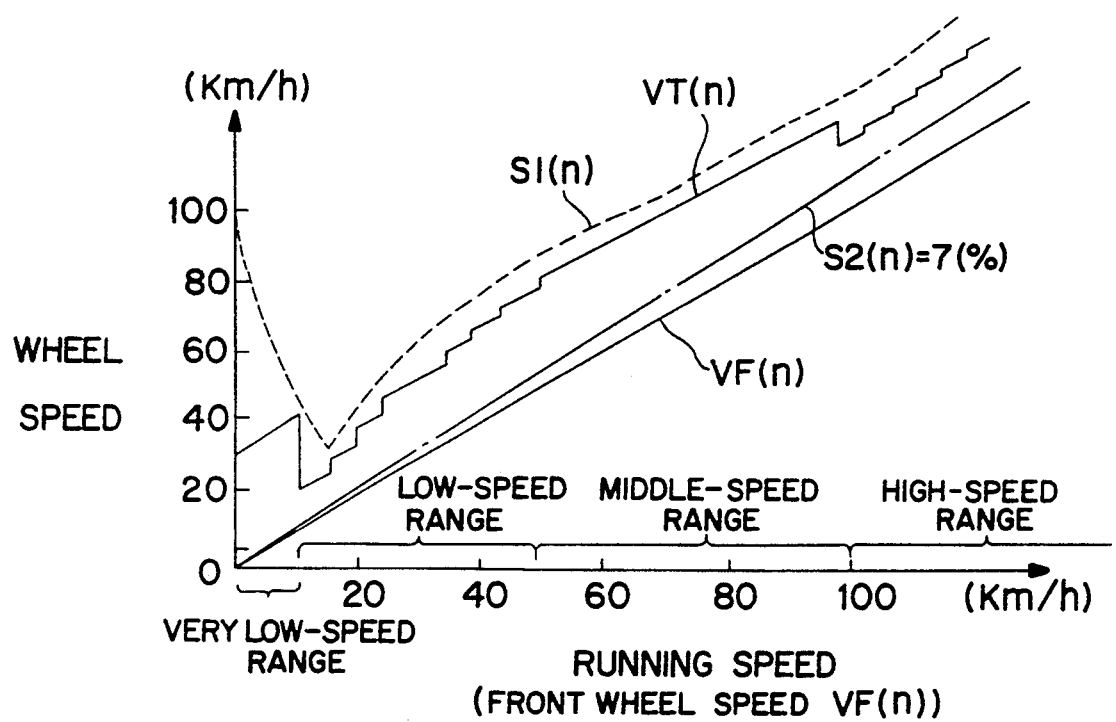
FIG. 15 is a graph showing desired slip VT(n) and slip ratios S1(n) as functions of running speed and wheel speed.

FIG. 15 is a graph showing, by way of example, the desired slip VT(n) shown in FIG. 13 and the slip ratios S1(n) and S2(n) in terms of the relation between the running speed (front wheel speed VF(n)) measured on the horizontal axis and the wheel speed (rear wheel speed VR(n) measured on the vertical axis. FIG. 15 also shows the front wheel speed VF(n). In this case, the front wheel speed VF(n) is measured on both the horizontal and vertical axes.

As is obvious from FIG. 15, the slip ratio S1(n) and the slip VT(n) for a very-low-speed range which are substantially the same as or higher than those for a middle-speed range, are decreased sharply to a minimum at the boundary between the very-low-speed range and the low-speed range, and are increased with the running speed of the vehicle.

The slip ratio S1(n) and the slip VT(n) increases gradually in a high-speed range. However, the respective rates of increase of the slip ratio S1(n) and the slip VT(n) in the high-speed range are smaller than those in the low-speed range. In this embodiment, the rate of increase of the slip ratio S1(n) is greater than that of the slip VT(n).

Referring to FIG. 8 again, a standard ignition angle $S\Theta_{ig(n)}$ is calculated on the basis of the engine speed Ne by a known method in step S19.

In step S20A, a query is made to see if failure occurred in the traction control CPU or in the front wheel speed sensor 3 or the rear wheel speed sensor 4, namely, if a first or second failure flag is set to the 1 state. If the response in step S20A is affirmative, a query is made in step S20B to see if the first failure flag is set to the 1 state. The routine goes to step S27 if the first failure flag is set to the 1 state or goes to step S23 when the second failure flag is set to the 1 state.

If the response in step S20A is negative, a query is made in step S21 to see if a check flag is set to the 1 state. The check flag is set to the 1 state upon the increase of the rear wheel speed VR(n) beyond a predetermined running speed $VR_{min}$ for the first time after the ignition switch has been closed, which will be described later with reference to step S18 in FIG. 30. The routine goes to step S27 when the check flag is set to the 0 state or goes to step S22 when the check flag is set to the 1 state.

In step S22, a query is made to see if a traction control cancellation flag is set to the 1 state. The traction control cancellation flag is set to the 1 state when the cancellation button 27 (FIG. 4) is depressed to cancel traction control and traction is controlled only by standard ignition timing control. The routine goes to step S27 when the traction control cancellation flag is set to the 1 state or goes to step S24 when the same is set to the 0 state. If the cancellation button 27 is depressed again, the traction control cancellation flag is set again to the 0 state.

In step S24, a query is made to see if the traction control mode ignition angle $C\Theta_{ig(n)}$ is employed for controlling the engine. The routine goes to step S47 if the response in step S24 is affirmative or goes to step S25 if the response in step S24 is negative.

In step S25, a query is made to see if the traction control mode ignition angle must be used for controlling the engine. The routine goes to step S32 if the response in step S25 is affirmative or goes to step S26 if the response in step S25 is negative.

Figure 16:
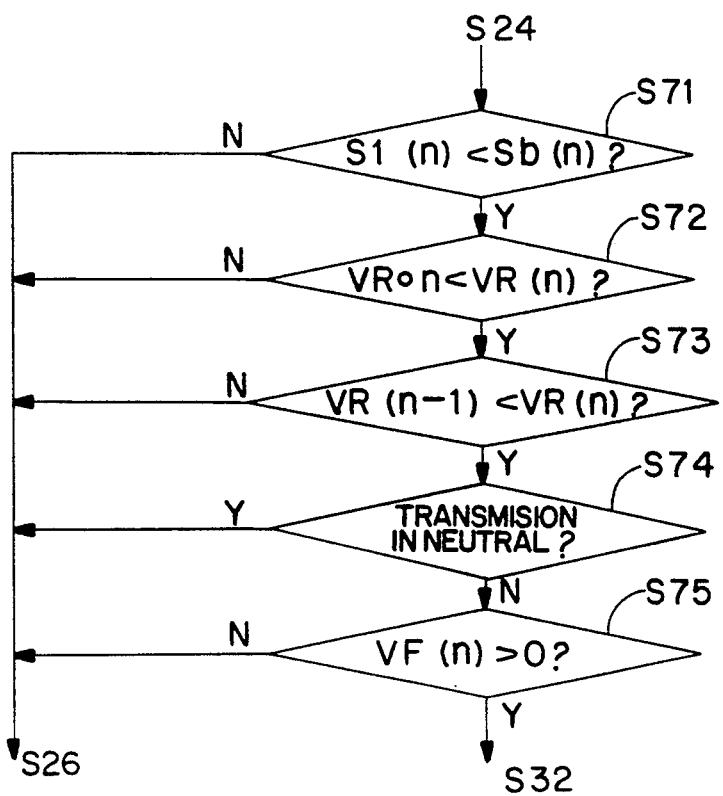
FIG. 16 is a flow chart of a subroutine to be executed in step S25.

FIG. 16 shows a routine to be executed in step S25. If it is decided that the actual slip ratio Sb(n) is greater than the slip ratio S1(n) in step S71, that the rear wheel speed VR(n) is higher than a predetermined running speed $VR_{ib}$ in step S72, that the current rear wheel speed VR(n) is greater than the preceding rear wheel speed VR(N-1), namely, the rear wheel speed is increasing, in step S73, that the transmission is set in a position other than the neutral position in step S74 and that the front wheel speed VF(n) is higher than zero in step S75, the routine goes to step S32 of FIG. 9. If the response in any one of the steps S71 to S75 is negative, the routine goes to step S26 of FIG. 9.

Referring again to FIG. 9, a query is made in step S26 to see if a mode change flag is set to the 1 state. The mode change flag is set to the 1 state when a mode change control routine, which will be described later, is being executed. The routine goes to step S37 when the mode change flag is set to the 1 state or goes to step S27 when the same is set to the 0 state.

In step S27, the standard ignition angle $S\Theta_{ig(n)}$ calculated in step S19 is selected.

In step S41, a query is made to see if ignition is timed qt the selected ignition angle. If the response in step S41 is affirmative, ignition is made in step S42, and then the routine goes to step S43. If the response in step S41 is negative, the routine jumps to step S43.

In step S43, a query is made to see if the traction control mode ignition angle $C\Theta_{ig(n)}$ (or $C\text{-}S\Theta_{ig(n)}$) is selected. When the response in step S43 is negative, the traction control mode pilot lamp 12 is turned off in step S46 and the routine is terminated.

If the response in step S43 is affirmative, a query is made to see if the absolute value of the difference between $C\Theta_{ig(n)}$ (or $C\text{-}S\Theta_{ig(n)}$) and $S\Theta_{ig(n)}$ is not smaller than a predetermined angle R. The routine goes to step S46 if the response in step S43 is negative or goes to step S45 when the response in step S43 is affirmative.

The traction control mode pilot lamp 12 is turned on in step S45, and then the routine is terminated.

When it is decided in step S25 that the traction control mode ignition angle is to be used, the traction control mode ignition angle $C\Theta_{ig(n)}$ is calculated in step S32. A routine to be executed in step S32 is shown in FIG. 17.

Figure 17:
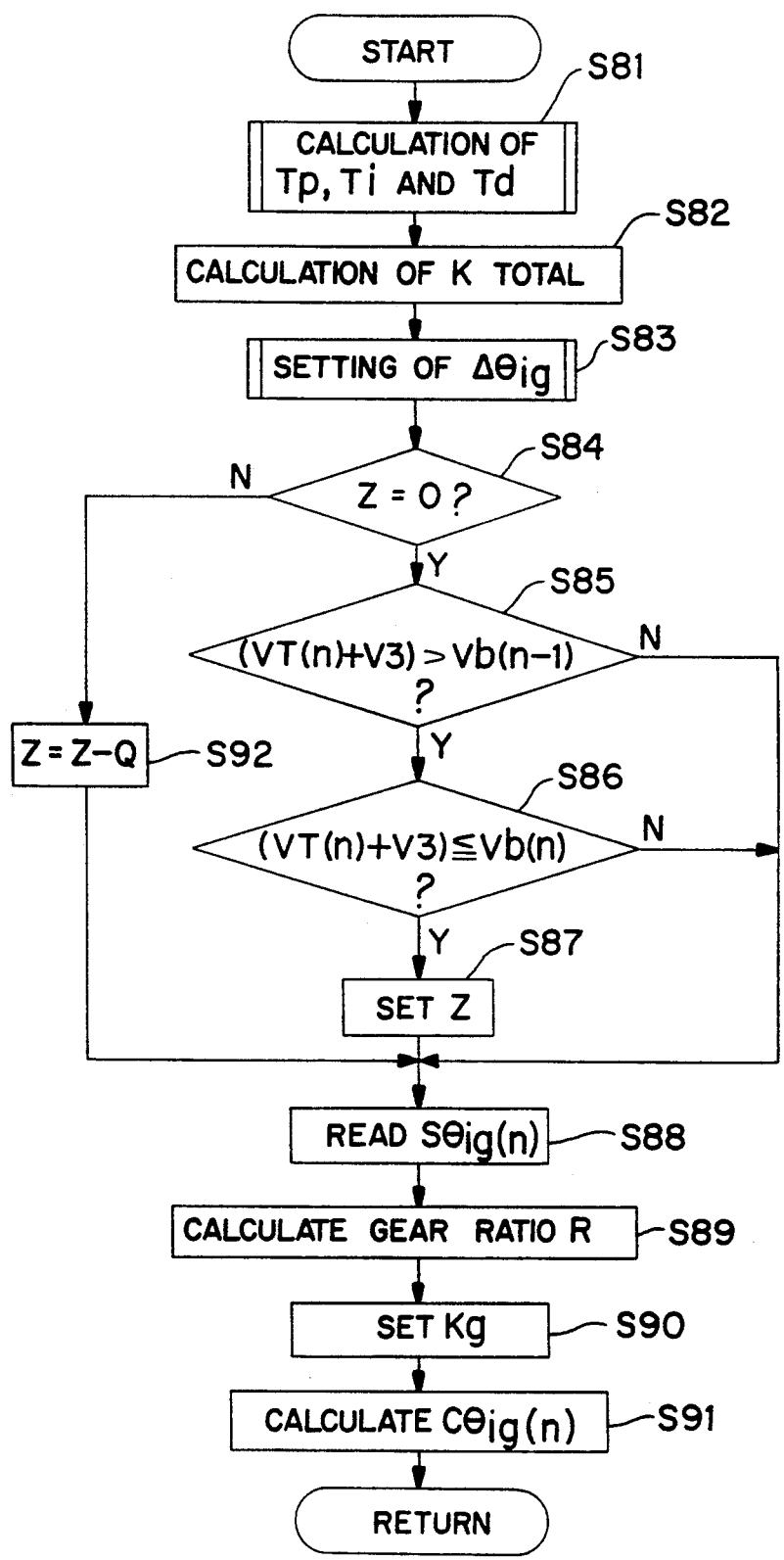
FIG. 17 is a flow chart of a subroutine to be executed in step S32.

Referring to FIG. 17, a proportional control term Tp, and integral control term Ti and a differential control term Td for PID feedback control are calculated by using expressions (5) to (7) in step S81.

$$Tp = (Vb(n) - VT(n)) \times Gp = \Delta V(n) \times Gp \quad (5)$$

$$\begin{aligned}Ti &= (\Delta V(n)) \\ &= \Delta V(n-1) = \Delta V(n-2) = \ldots + \Delta V(1) \times Gi \\ &= dt\Sigma\ \Delta V(n) \times Gi\end{aligned} \quad (6)$$

$$Td = (\Delta V(n-1) - \Delta V(n) \times Gd \quad (7)$$

where Gp, Gi and Gd are predetermined control gains, and $\Delta V(n)$ is the difference between the current slip Vb(n) and the desire slip VT(n). In the expression (6) $dt\Sigma\ \Delta V(n)$ is the sum of values of $\Delta V(n)$ calculated at the periodic interruptions from the first periodic interruption to the current periodic interruption.

In step S82, the control terms for PID feedback control are added.

$$K_{total} = Tp + Ti + Td \quad (8)$$

Figure 18:
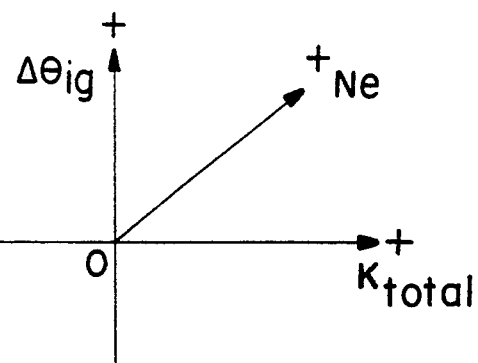
FIG. 18 is a map of basic correction $\Delta\Theta_{ig}$.
Figure 19:
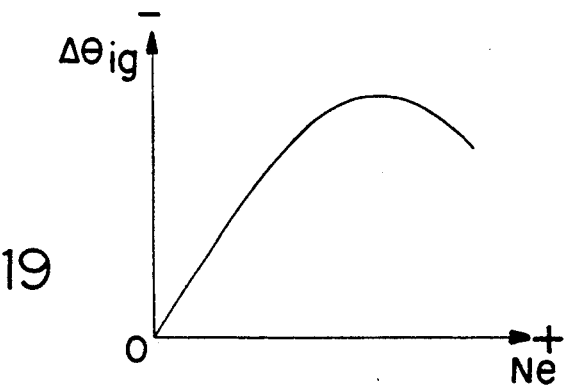
FIG. 19 is a graph showing the relation between basic correction $\Delta\Theta_{ig}$ and the engine speed Ne.
Figure 20:
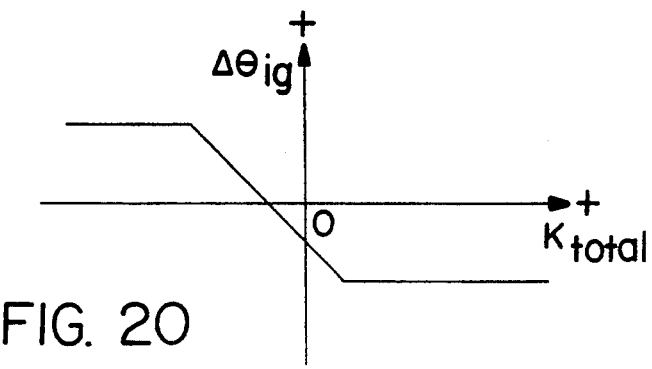
FIG. 20 is a graph showing the relation between basic correction $\Delta\Theta_{ig}$ and $K_{total}$.

In step S83, a basic correction $\Delta\Theta_{ig}$ is determined by using the sum $K_{total}$ and the engine speed Ne read in step S15. The basic correction $\Delta\Theta_{ig}$ is found in a map of FIG. 18 showing the basic correction $\Delta\Theta_{ig}$ as a function of $K_{total}$ and engine speed Ne as parameters. The map is produced on an assumption that the basic correction $\Delta\Theta_{ig}$ varies with the engine speed Ne as shown in FIG. 19 and varies with the $K_{total}$ as shown in FIG. 20. In FIGS. 18 to 20, positive values of $\Delta\Theta_{ig}$ are for advancing the ignition time, and negative values of $\Delta\Theta_{ig}$ are for delaying the ignition time.

In step S84, query is made to see if a subtraction correction Z set in step S87, which will be described later, is zero. In step S87, the subtraction correction Z is set for a positive value.

If Z=0, a query is made in step S85 to see if the actual slip Vb(n−1) calculated in the preceding control cycle is smaller than the sum of the desired slip VT(n) and a predetermined slip V3. The routine goes to step S88 when the response in step S85 is negative or goes to step S86 when the response in step S85 is affirmative.

In step S86, a query is made to see if the actual slip Vb(n) calculated in the current control cycle is not less that the sum of the desired slip Vt(n) and the predetermined slip V3. The routine goes to step S88 when the response in step 86 is negative or goes to S87 when the response in step S86 is affirmative.

Figure 21:
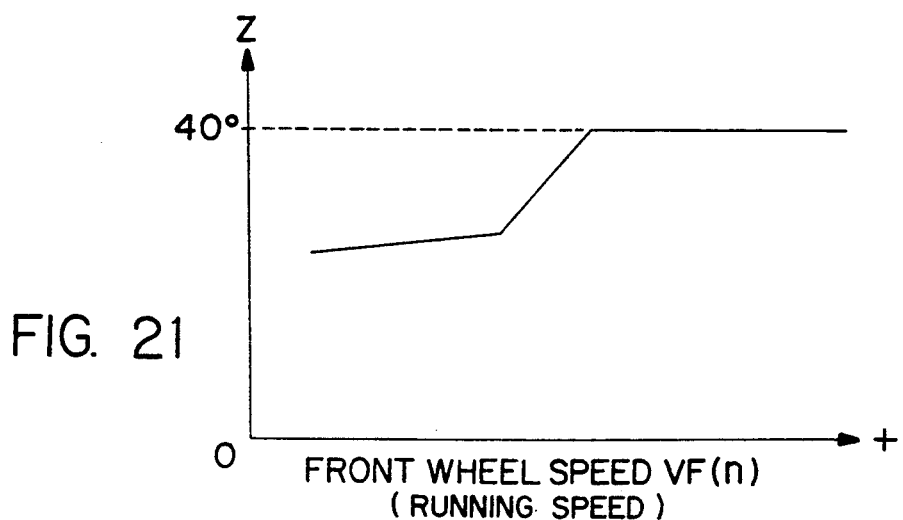
FIG. 21 is a graph showing the relation between subtraction correction Z and the front wheel speed VF(n)

In step S87, a subtraction correction Z corresponding to, for example, the front wheel speed VF(n), i.e., the running speed of the motorcycle, is read, and then the routine goes to step S88. The subtraction correction Z increases with the front wheel speed VF(n), for example, as shown in FIG. 21.

Even if the slipping state in high-speed running and the slipping state in low-speed running are the same, it is desirable to reduce the traction more quickly in high-speed running than in low-speed running. This embodiment uses subtraction correction Z corresponding to the running speed of the motorcycle for more satisfactory traction control. The subtraction correction Z is, similarly to the basic correction $\Delta\Theta_{ig}$, is an angle for increasing the ignition angle for traction control mode ignition timing control.

If the response in step S84 is negative, a predetermined delay angle Q is subtracted from the subtraction correction Z in step S92, and then the routine goes to step S88.

In step S88, the standard ignition angle calculated in step S19 of FIG. 8 is read. In step S89, the gear ratio R of the transmission, not shown, of the motorcycle is calculated by using an expression (9).

$$R = (VR(n) \times 100)/(Ne \times 60) \quad (9)$$

Figure 22:
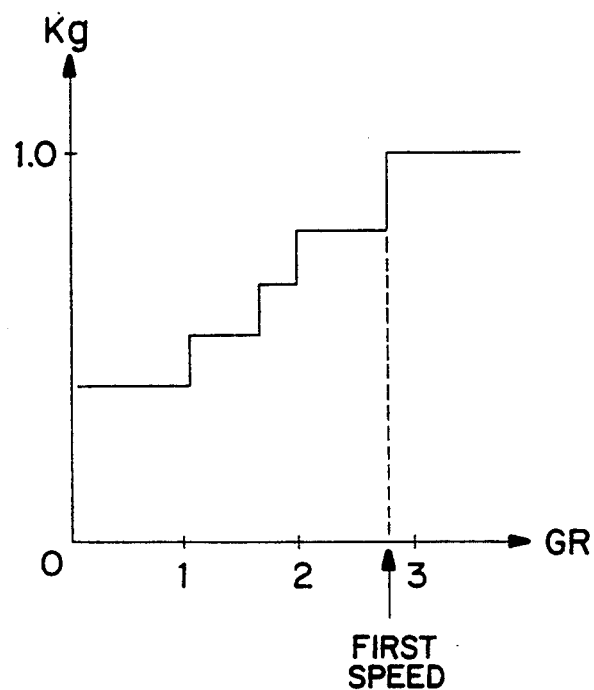
FIG. 22 is a graph showing the relation between gear ratio coefficient Kg and gear ratio R.

In step S90, a gear ratio coefficient Kg corresponding to the gear ratio R is set. As shown in FIG. 22, the gear ratio coefficient Kg increases with the gear ratio R. Thus, the basic correction $\Delta\Theta_{ig}$ is increased when the torque of the engine is high.

In step S91, the traction control mode ignition angle $C\Theta_{ig(n)}$ is calculated by using an expression (10).

$$C\Theta_{ig(n)} = S\Theta_{ig(n)} + \{(\Delta\Theta_{ig} \times Kg) - Z\} \quad (10)$$

Figure 27:
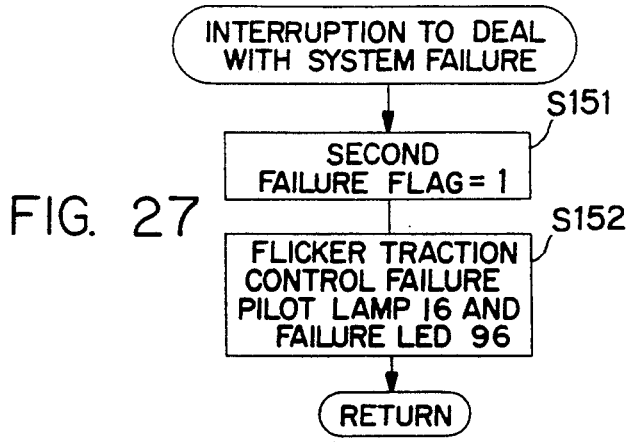
FIG. 27 is a flow chart of an interrupt procedure to be executed in case failure occurs in the traction control unit during traction control.

After thus calculating $C\Theta_{ig(n)}$, the routine shown in FIG. 27 is terminated. As is obvious from the expression (10), the ignition angle $C\Theta_{ig(n)}$ is delayed by a large angle in a state immediately after the subtraction correction Z has been set as compared with a state in which Z is not set (Z=0).

Referring again to FIG. 9, a query is made in step S33 to see if the control operation using the traction control mode ignition angle is to be changed for control operation using the standard ignition angle. The routine goes to step S38 when the response in step S33 is negative or goes to step S34 when the response in step S33 is affirmative.

Figure 23:
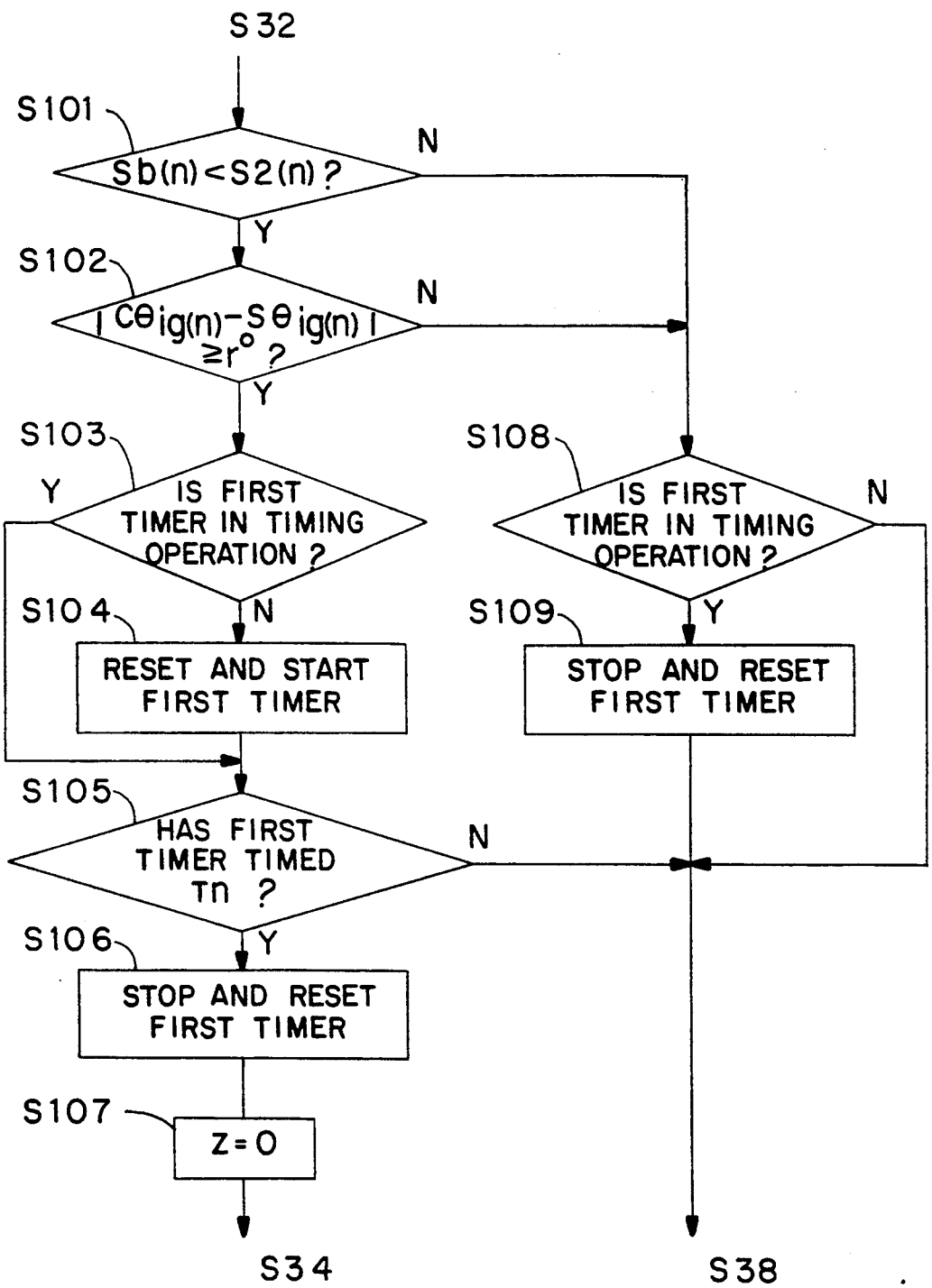
FIG. 23 is a flow chart of a subroutine to be executed in step S33.

A routine to be executed in step S33 is shown in FIG. 23. Referring to FIG. 23, a query is made to see if the actual slip ratio Sb(n) is lower than the traction control mode ignition timing control terminating slip ratio S2(n). The routine goes to step S108 when the response in step S101 is negative or goes to step S102 when the response in step S101 is affirmative.

In step S102, a query is made to see if a first standard control mode reset time is in timing operation. The routine goes to step S105 when the response in step S103 is affirmative or goes to step S104 when the response in step S103 is negative. In step S104, the first standard control mode reset timer is reset and is started for timing operation.

In step S105, a query is made to see if the first standard control mode reset timer has timed a predetermined time Tn. The routing goes to step S38 when the response in step S105 is negative.

If the response in step S105 is affirmative, the first standard control mode reset timer is stopped and reset in step S106, the subtraction correction Z is set for zero in step S107, and then the routine goes to step S34.

If the response in step S101 or S102 is negative, a query is made in step S108 to see if the first standard control mode reset timer is in timing operation. The routine goes to step S38 after stopping and resetting the first standard control mode reset timer in step S109. If the response in step S108 is negative, the routine jumps to step S38.

Referring again to FIG. 9, when the response in step S33 is negative, the traction control mode ignition angle $C\Theta_{ig(n)}$ is selected as the ignition angle $\Theta_{ig(n)}$ in step S38.

A query is made in step S39 to see if a $C\Theta_{ig}$ timer for measuring time elapsed after traction control has been started is in timing operation. The routine goes to step S41 if the response in step S38 is affirmative. When the response in step S39 is negative, the $C\Theta_{ig}$ timer is reset and started in step S40, and then step S41 is executed. If the response in step S33 is affirmative, the $C\Theta_{ig}$ timer is stopped and reset in step S34.

Then, in step S36, a mode change flag is set to the 1 state, and then step S37 is executed. A routine to be executed in step S37 is shown in FIG. 24.

Figure 24:
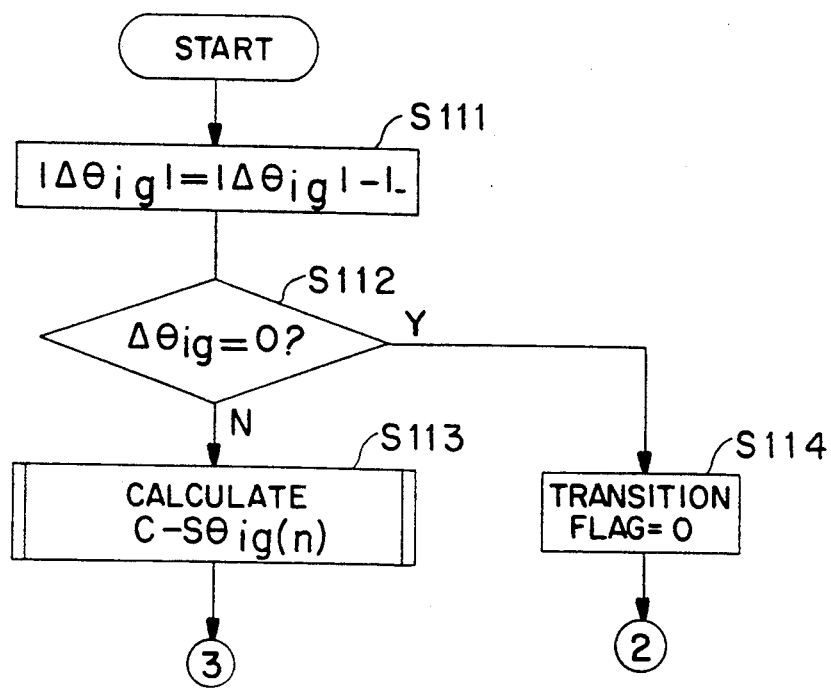
FIG. 24 is a flow chart of a subroutine to be executed in step S37.

Referring to FIG. 24, the absolute value of the basic correction $\Delta\Theta_{ig}$ is reduced by a predetermined value L in step S111.

In step S112, a query is made to see if the basic correction $\Delta\Theta_{ig}$ is zero. When the response in step S112 is affirmative, the mode change flag is set to the 0 state in step S114, and then the routine goes to step S27. If the response in step S112 is negative, an ignition angle $C\text{-}S\Theta_{ig(n)}$ is calculated in step S113 by using an expression (11).

$$C\text{-}S\Theta_{ig(n)} = S\Theta_{ig(n)} + \Delta\Theta_{ig} \quad (11)$$

The $\Delta\Theta_{ig}$ in the expression (11) be substituted by a value obtained by multiplying the $\Delta\Theta_{ig}$ calculated in step S111 by the gear ratio coefficient Kg. Then, the routine goes to step S41.

In step S47, a query is made to see if a VT reduction flag is set to the 1 state. The routine goes to step S31 when the Vt reduction flag is set to the 1 state or goes to step S30 when the same is set to the 0 state.

Figure 25:
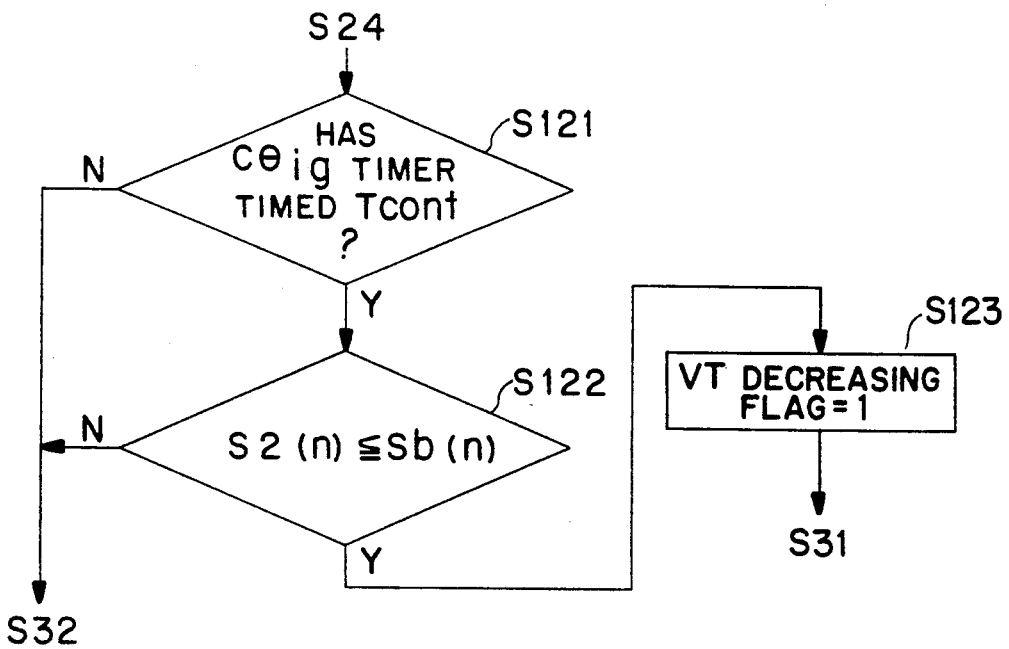
FIG. 25 is a flow charge of a subroutine to be executed in step S30.

Referring to FIG. 25 showing a routine to be executed in step S30, a query is made in step S121 to see if a $C\Theta_{ig}$ timer has measured a predetermined time $T_{cont}$ (for example, 3 sec.). The routine goes to step S32 if the response in step S121 is negative or goes to step S122 if the response in step S121 is affirmative.

In step S122, a query is made to see if the actual slip ratio Sb(n) is not smaller than the traction control mode ignition control terminating slip ratio S2(n). When Sb(n) is smaller than S2(n), step S32 is executed. When Sb(n) is equal to or greater than S2(n), the Vt reduction flag is set to the 1 state in step S123, and then a Vt reduction control routing in step S31 of FIG. 9 is executed.

In deciding the start of the VT reduction control, step S122 may be omitted and only step S121 may be executed.

Figure 26:
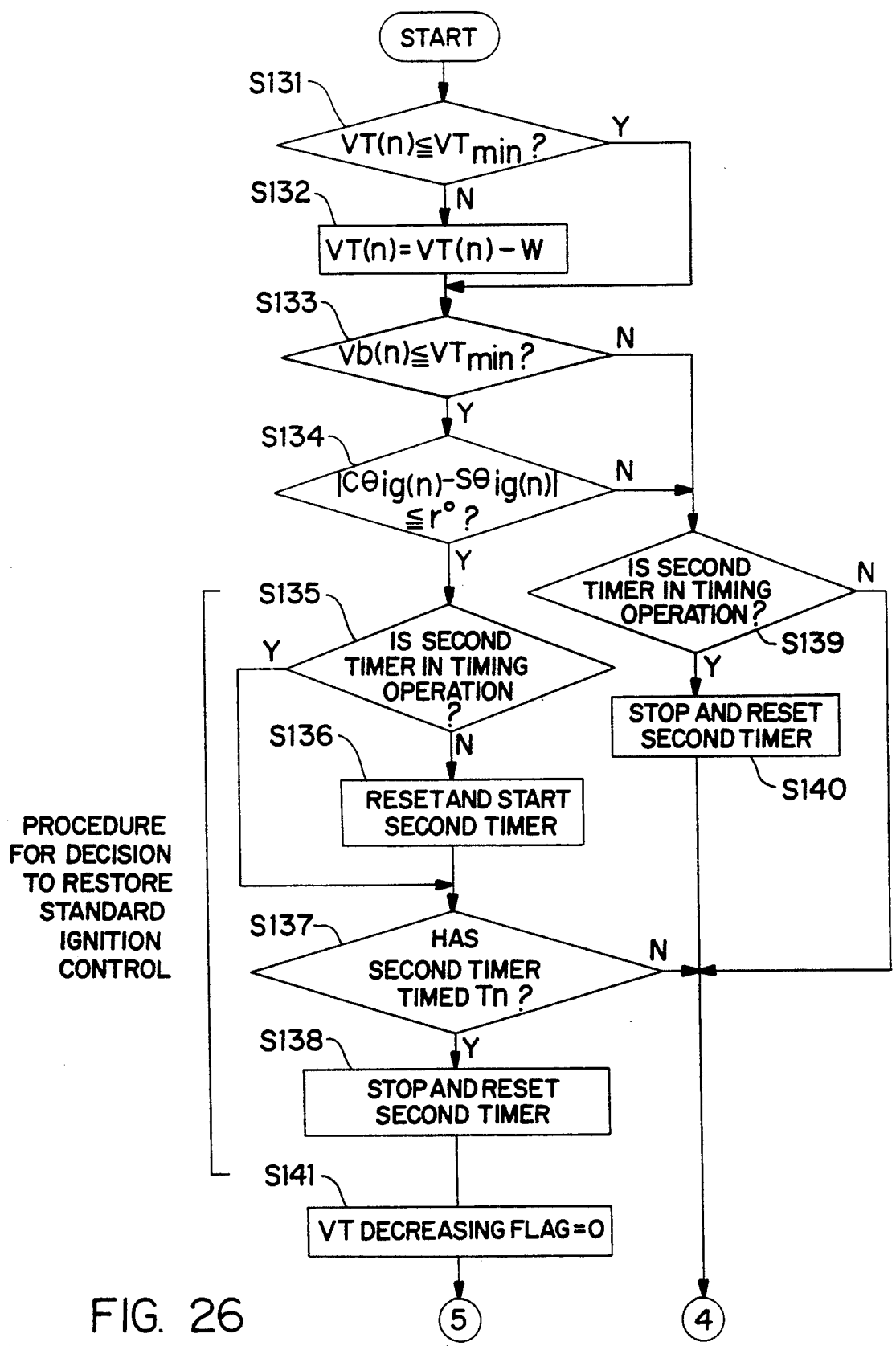
FIG. 26 is a flow chart of a subroutine to be executed in step S31.

Referring to FIG. 26 showing a routine to be executed in step S31, a query is made in step S131 to see if the desired slip VT(n) is equal to or less than a predetermined slip $VT_{min}$ (for example, 0 km/hr, i.e., VF(n)=VR(n)). The routine goes to step S133 when the response in step S131 is affirmative or goes to step S132 when the response in step S131 is negative. In step S132, a new desired slip VT(n) is determined by subtracting a predetermined value W from the desired slip VT(n), and then step S133 is executed.

In steps S133 to S140, it is decided whether the VT(n) is reduced to and the traction control operation is to be continued or whether the traction control operation is to be terminated and the control operation using the standard ignition angle $S\Theta_{ig(n)}$ is to be started.

In step S133, a query is made to see if the actual slip Vb(n) is equal to or less than $VT_{min}$. The routine goes to step S139 when the response in step S133 is negative or goes to step S134 when the response in step S133 is affirmative.

In step S134, a query is made to see if the absolute value of the difference between $C\Theta_{ig(n)}$ and $S\Theta_{ig(n)}$ is not greater than a predetermined angle r. The routine goes to step S139 when the response in step S134 is negative or goes to step S135 when the response in step S134 is affirmative. The threshold angle r may be either equal to or different from the angle r used in step S102.

In step S135, time elapsed after affirmative decision in steps S133 and S134, and a query is made to see if a second standard control mode reset timer is in timing operation. The routine goes to step S137 when the response in step 135 is affirmative or goes to step S136 when the response in step S135 is negative. In step S136, the second standard control mode reset timer is reset and started for timing operation.

In step S137, a query is made to see if the second standard control mode reset timer has timed a predetermined time Tn. The routine goes to step S32 when the response in step S137 is negative or goes to step S138 when the response in step S137 is affirmative. In step S138, the second standard control mode reset timer is stopped and reset, the Vt reduction flag is set to the 0 state in step S141, and then step S34 is executed. The time Tn used in step S137 may be either equal to or different from the time Tn used in step S105.

When the response in step S133 or S134 is negative, a query in made in step S137 to see if the second standard control mode reset timer is in timing operation. When the response in step S139 is affirmative, the timer is stopped and reset in step S140, and then step S32 is executed. When the response in step S139 is negative, the routine jumps to step S32.

During the execution of those routines, failure monitoring operation is executed to monitor the traction control system to see whether or not the traction control system is operating normally, namely, whether or not the traction control CPU of the ignition control ECU 31 is operating normally and whether or not the sensors including the front wheel speed sensor 3 and the rear wheel speed sensor 4 are connected properly.

When $S\Theta_{ig(n)}$ is provided, the first failure flag is set to the 1 state when an interrupt process is executed for failure monitoring operation. When $C\Theta_{ig(n)}$ is provided, an interrupt process shown in FIG. 27 is executed.

Referring to FIG. 27, a second failure flag is set to the 1 state in step S151. In step S152, the traction control failure pilot lamp 16 and the traction control failure LED 96 are actuated to flicker, and then the routine returns to the main routine.

When the second failure flag is set to the 1 state in step S151, the routine goes from step S20B to step S23 of FIG. 8 to execute a failure routine. FIG. 28 shows the details of the failure process to be executed in step S23. The failure process is executed when the traction control CPU is unable to calculate ignition angle. The failure process may be carried out by the ignition control CPU or by a CPU provided specially for failure process.

Figure 29:
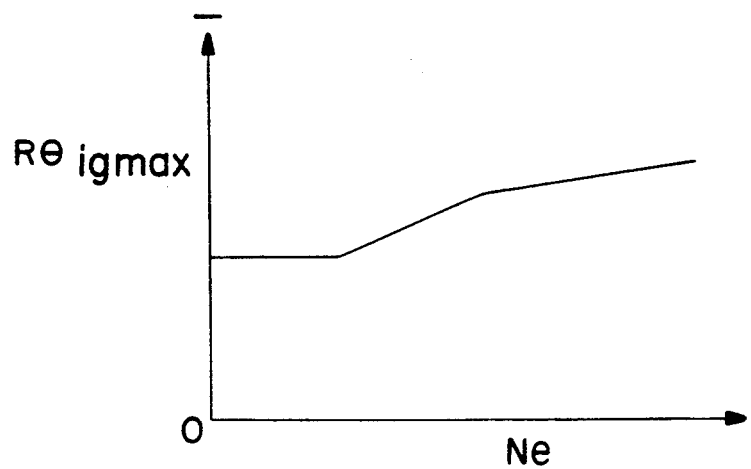
FIG. 29 is a graph showing the relation between $R\Theta_{igmax}$ read in step S161 and engine speed Ne.

Referring to FIG. 28, an ignition delay angle $R\Theta_{igmax}$ (a negative value) corresponding to the engine speed Ne is read from a table as shown in FIG. 29.

A query is made in step S162 to see if a failure control start flag, which is set to the 1 state when the routine shown in FIG. 28 is selected, is set to the 1 state. When the response in step S162 is negative, namely, when the failure process is selected for the first time, the failure control start flag is set to the 1 state in step S163.

In step S164, a query is made to see if the current ignition delay angle (a negative value) is not greater than $R\Theta_{igmax}$. The current ignition delay angle is $\{(\Delta\Theta_{ig} \times Kg) - Z$ (a negative value) expressed by the expression (10) if the traction control mode ignition timing control is in process (when step S38 is executed), $\Delta\Theta_{ig}$ (a negative value) expressed by the expression (11) in a transient state in which the traction control mode ignition timing control is being changed for the standard ignition timing control (when step S37 is executed) or zero when the standard ignition timing control is in process (when step S27 is executed).

If the current ignition delay angle is not greater than $R\Theta_{igmax}$, namely, equal to $R\Theta_{igmax}$ or on the delay side with respect to $R\Theta_{igmax}$, the current ignition delay angle is set for $R\Theta_{igmax}$ in step S165. If the current ignition delay angle is greater than $R\Theta_{igmax}$, namely, the current ignition delay angle is on the side of advance angle with respect to $R\Theta_{igmax}$, $R\Theta_{igmax}$ is set for a value obtained by subtracting a predetermined value M (a positive value) from the current ignition delay angle in step S166; that is, the current ignition delay angle is delayed by the value M to set $R\Theta_{igmax}$. Step S165 may be omitted.

Ignition angle $P_{ig(n)}$ is calculated in step S167 by using an expression (12).

$$\Theta_{ig(n)} = S\Theta_{ig(n)} + R\Theta_{igmax} \qquad (12)$$

In step S168, $R\Theta_{igmax}$ is set as $R\Theta_{ig(n)}$ for use in steps S169 and S170, and then the routine goes to step S41 (FIG. 10).

When it is decided in step S162 that the failure control start flag is set to the 1 state, a query is made in steps S169 to see if the $R\Theta_{ig(n)}$ set in step S168 in the preceding control cycle, namely, $R\Theta_{ig(n-1)}$, is not greater than $R\Theta_{igmax}$. When the response in step S169 is affirmative, a first failure flag is set to the 1 state and a second failure flag is set to the 0 state in step S171, and then step S167 is executed. When the response in step S169 is negative, $R\Theta_{igmax}$ is set for a value obtained by subtracting the predetermined delay angle M from $R\Theta_{ig(n-1)}$; that is, $R\Theta_{ig(n-1)}$ is corrected by the delay angle M. Then, step S167 is executed.

It is possible to omit step S171, to obtain the ignition angle $P_{ig(n)}$ by adding $S\Theta_{ig(n)}$ to the $R\Theta_{igmax}$ read in step S161 and to continue running while holding the ignition delay angle at the value found in the table shown in FIG. 29.

Figure 30:
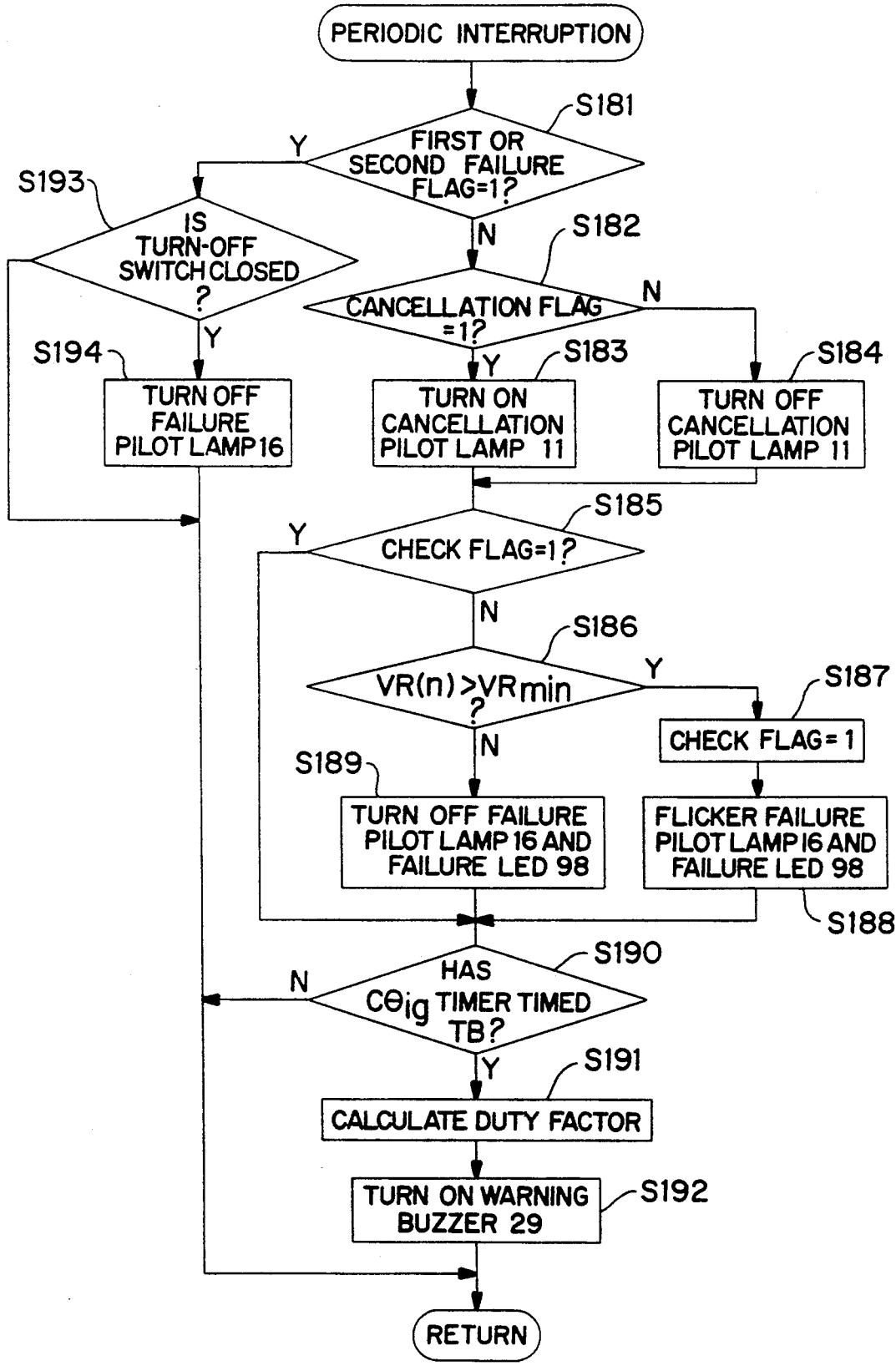
FIG. 30 is a flow chart of a lamp control procedure to be executed in a periodic interrupt mode.

The control of the lamps shown in FIG. 5 will be described hereinafter. FIG. 30 is a flow chart of a lamp control routine to be executed in a periodic interrupt mode. In step S181, a query is made to see if the first or the second failure flag is set to the 1 state.

When the response in step S181 is negative, a query is made to see if the traction control cancellation flag described with reference to step S22 (FIG. 8) is set to the 1 state. When the response in step S182 is affirmative, the traction control cancellation pilot lamp 11 (FIG. 5) is turned on in step S183. When the traction cancellation flag is set to the 0 state, the traction control cancellation pilot lamp 11 is turned off in step S184.

In step S185, a query is made to see if a check flag is set to the 1 state. The check flag is set to the 1 state upon the increase of the rear wheel speed VR(n) beyond a predetermined speed $VR_{min}$ for the first time after the ignition switch has been closed. The routine goes to step S190 when the response in step S185 is affirmative or goes to step S186 when the response in step S185 is negative.

In step S186, a query is made to see if the rear wheel speed VR(n) has exceeded the predetermined speed $VR_{min}$ for the first time after the ignition switch has been closed. When the response in step S186 is negative, traction control failure pilot lamp and the traction control failure LED 96 (FIG. 5) are actuated to flicker in step S189, and the step S190 is executed.

In step S190, if the traction control is in effect, a query is made to see if the $C\Theta_{ig}$ timer (step S39 in FIG. 9) has timed a predetermined time TB after the start of traction control. The routine is terminated when the response in step S190 is negative or the routine goes to step S191 when the response in step S190 is affirmative.

Figure 31:
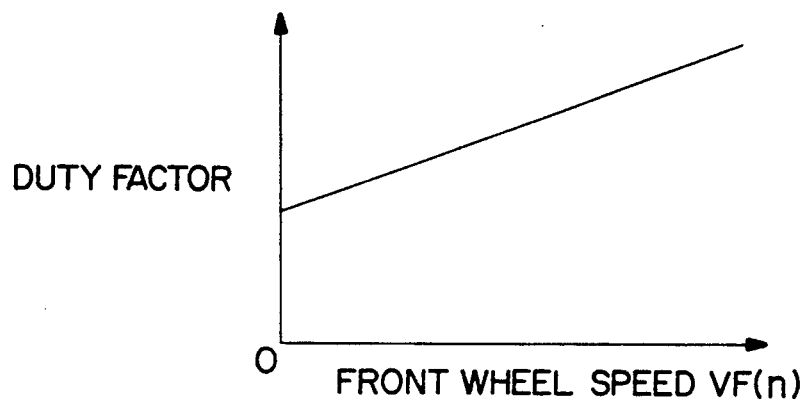
FIG. 31 is a graph showing the variation of duty factor for controlling a warning buzzer with engine speed Ne.
Figure 32:
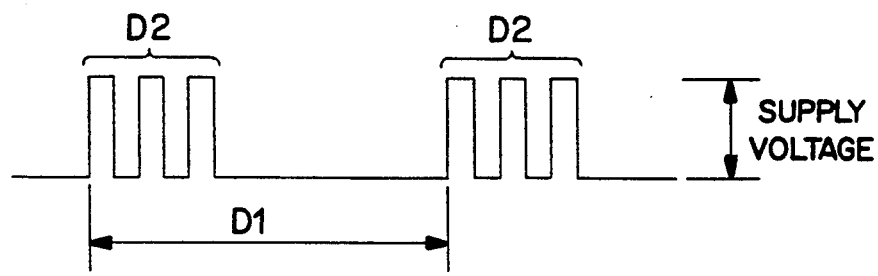
FIG. 32 is a waveform diagram of voltage to be applied to the warning buzzer.

In step S191, a duty factor corresponding to the front wheel speed is read from a table as shown in FIG. 31. In step S192, the warning buzzer 29 is energized according to the duty factor read from the table. A voltage of a waveform as shown in FIG. 32 is applied to the warning buzzer 29. As shown in Figure 32, pulse groups D2 each having a plurality of pulses are generated at a period D1. The number of pulses in each pulse group D2 is changed according to the duty factor.

Since the duty factor increases with the front wheel speed VF(n) as shown in FIG. 31, the number of pulses of each pulse group D2 increases with the running speed of the motorcycle, and the average voltage applied to the warning buzzer 29 increases to increase the sound pressure. The routine is terminated after the execution of step S192.

When it is decided in step S181 that the first or the second failure flag is set to the 1 state, a query is made in step S193 to see if a lamp switch, not shown, is closed. When the response in step S193 is negative, the routine is terminated. When the response in step S193 is affirmative, only the traction control failure pilot lamp 16 is turned off and then the routine is terminated. If the traction control failure pilot lamp 16 has been turned off before step S194, the routine is terminated immediately.

Figure 1:
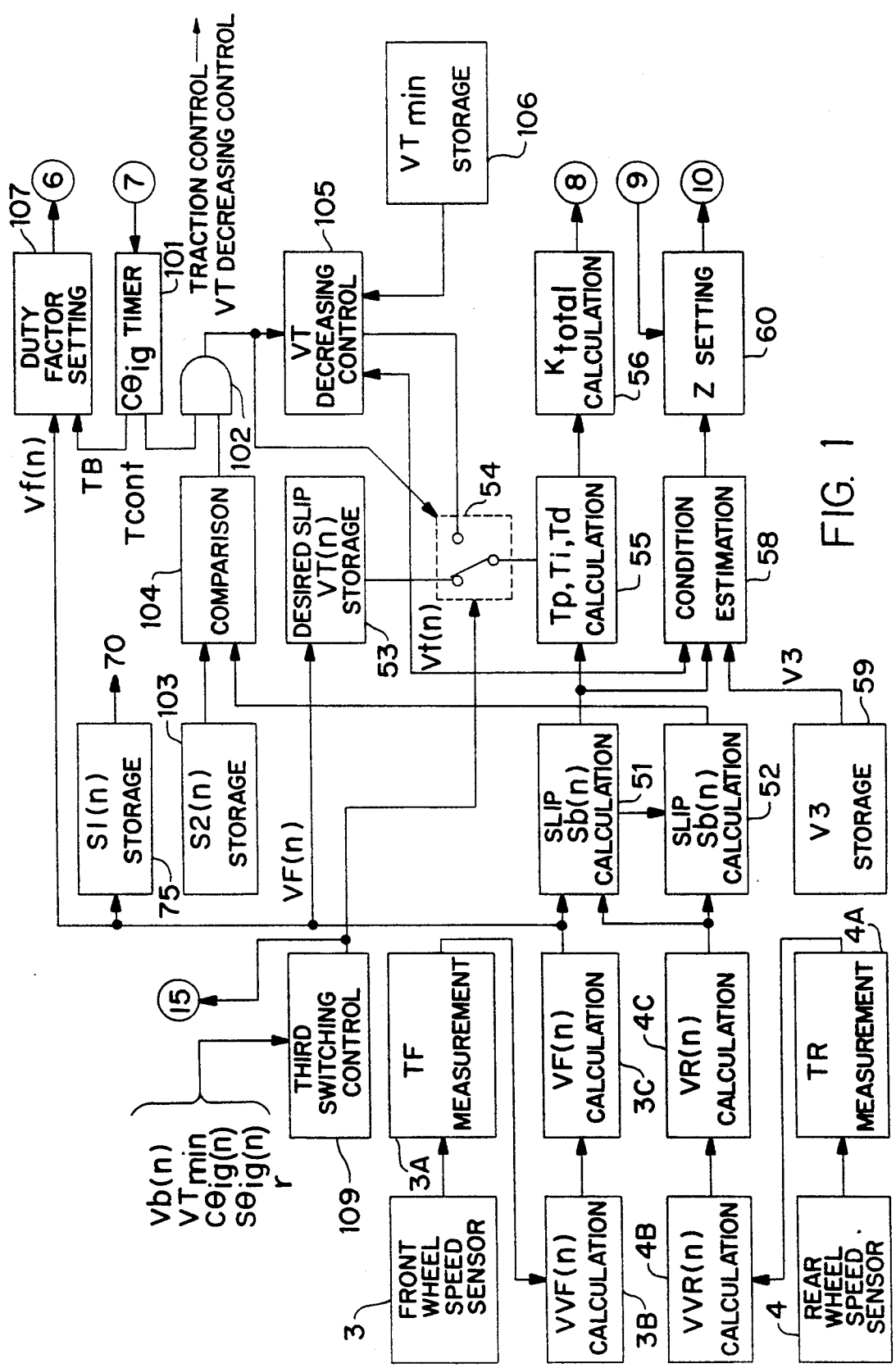
FIG. 1 is a block diagram showing the functions of an automotive traction control system in a preferred embodiment according to the present invention.
Figure 2:
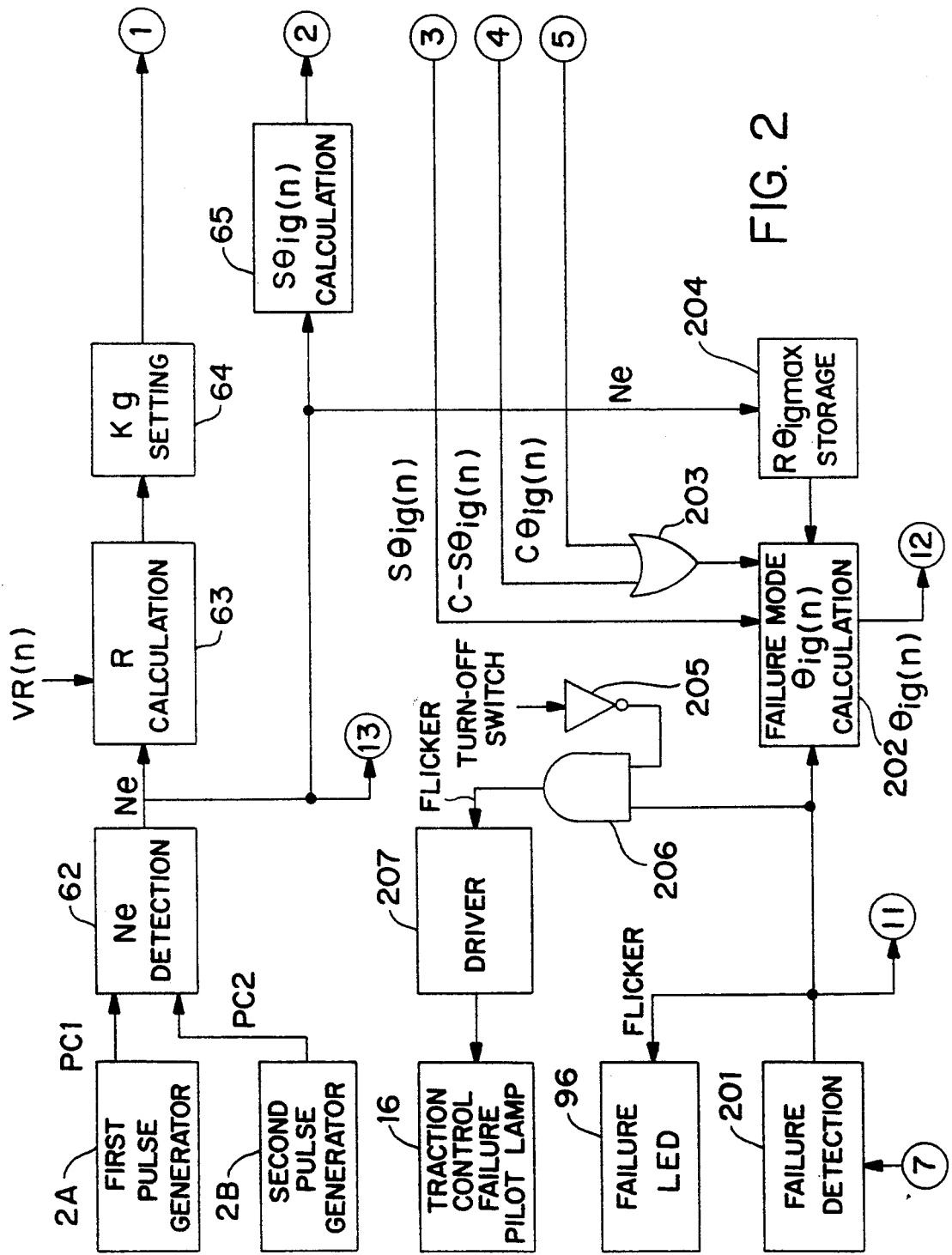
FIG. 2 is a block diagram showing the functions of an automotive traction control system in a preferred embodiment according to the present invention.
Figure 34:
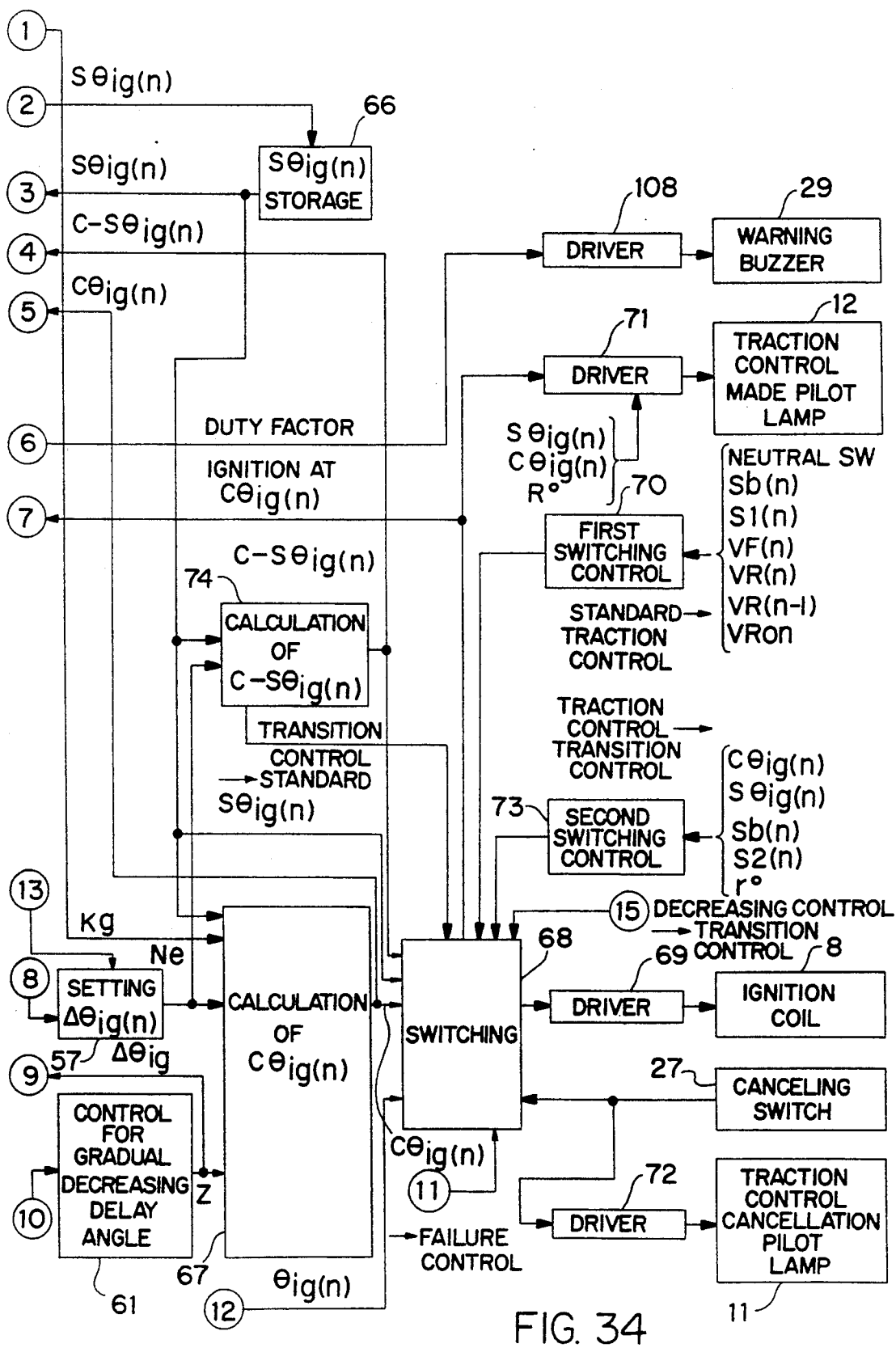
FIG. 34 is a block diagram showing the functions of an automotive traction control system in a preferred embodiment according to the present invention.

FIGS. 1, 2 and 34 are block diagrams showing the function of the automotive traction control system in a preferred embodiment according to the present invention, wherein parts like or corresponding to those shown in FIG. 6 are denoted by the same reference characters. Referring to FIGS. 1, 2 and 34, an engine speed detector 62 detects engine speed Ne on the basis of the respective output signals PC1 and PC2 of the first pulse generator 2A and the second pulse generator 2B.

Pulse period measuring means 3A and 4A, wheel speed calculating means 3B and 4B, and average wheel speed calculating means 3C and 4C calculate TF, TR, VVF(n), VVR(n), VF(n) and VR(n), respectively, by a procedure shown in FIG. 11 on the basis of the output pulse signals of the front wheel speed sensor 3 and the rear wheel speed sensor 4.

A slip calculating means 51 calculates actual slip Vb(n) by using the expression (3). A slip ratio calculating means 52 calculates slip ratio Sb(n) by using the express (4). A desired slip storage means 53 stores a table as shown in FIG. 13. A desired slip VT(n) corresponding to VF(n) is given through switching means 54 to a control data calculating means 55.

The control data calculating means 55 calculates control terms Tp, Ti and Td for feedback control by using the expressions (5) to (7). A $K_{total}$ calculating means 56 calculates $K_{total}$ by using the expression (8).

A $\Delta\Theta_{ig}$ setting means 57 stores basic correction tables as shown in FIGS. 18 to 20, and gives a basic correction $\Delta\Theta_{ig}$ corresponding to $K_{total}$ and engine speed Ne to a traction control mode ignition angle calculating means 67.

A condition estimating means 58 executes steps S85 and S86 of FIG. 17 by using a slip Vb(n) calculated in the current control cycle, a slip Vb(n-1) calculated in the preceding control cycle, a desired slip VT(n) and V3 stored in a V3 storage means 59.

A Z setting means 60 is driven by the condition estimating means 58 to set a subtraction correction Z corresponding to the front wheel speed VF(n) when no subtraction correction Z is provided by a diminution control means 61 (when Z 0). The subtraction correction Z corresponding to the front wheel speed VF(n) is read from a table stored beforehand in a table as shown in FIG. 21.

The diminution control means 61 diminishes the subtraction correction Z set by the Z setting means 60 at predetermined time intervals, for example, every time the traction control mode ignition angle calculating means 67 performs calculation, and gives the diminished subtraction correction Z to the traction control mode ignition angle calculating means 67. The diminution control means 61 inhibits the Z setting means 60 from resetting a subtraction correction Z until the subtraction correction Z is diminished to zero.

An R calculating means 63 calculates a gear ratio R on the basis of the engine speed Ne and the rear wheel speed VR(n) by using the expression (9).

A Kg setting means 64 sets a gear ratio coefficient Kg corresponding to the gear ratio R. The Kg corresponding to the gear ratio R is read from a table storing values for Kg in connection with values for gear ratio R as shown in FIG. 22. The gear ratio coefficient Kg is given to the traction control mode ignition angle calculating means 67.

A standard ignition angle calculating means 65 calculates a standard ignition angle $S\Theta_{ig(n)}$ on the basis of the engine speed Ne by a known method. The calculated standard ignition angle $S\Theta_{ig(n)}$ is stored temporarily in an ignition angle storage means 66 and given to a switching means 68.

The traction control mode ignition angle calculating means 67 calculates a traction control mode ignition angle $C\Theta_{ig(n)}$ on the basis of the basic correction $\Delta\Theta_{ig}$ provided by the $\Delta\Theta_{ig}$ setting means 57, the gear ratio coefficient Kg provided by the Kg setting means 64, the subtraction correction Z provided by the diminution control means 61, and the standard ignition angle $S\Theta_{ig(n)}$ stored in the ignition angle storage means 66 by using the expression (10) and gives the traction control mode ignition angle $C\Theta_{ig(n)}$ to the switching means 68.

A switching means 36 gives the standard ignition angle $S\Theta_{ig(n)}$ to a driver (an ignition controller) 69 for driving the ignition coil 8 in the normal state. When a first switching control means 70 provides a control signal, the switching means 36 gives the traction control mode ignition angle $C\Theta_{ig(n)}$ to the ignition controller 69. The ignition controller 69 drives the ignition coil 8 at the ignition angle given thereto.

The first switch control means 37 executes step S25 of FIG. 9 (steps of FIG. 16). When the response in step S22 of FIG. 16 is affirmative, gives a mode change control signal to the switching means 68 to change standard ignition control for a traction control mode ignition control.

When $C\Theta_{ig(n)}$ is provided by the switching means 68, a driver 71 executes step S44 of FIG. 10 by using $C\Theta_{ig(n)}$ and $S\Theta_{ig(n)}$ and turns on the traction control mode pilot lamp 12 when the decision in step S44 is affirmative.

When $C\Theta_{ig(n)}$ is selected by the switching means 68, a $C\Theta_{ig}$ timer 101 is started. Upon the timing of a predetermined time $T_{cont}$ by the $C\Theta_{ig}$ timer 101, an AND gate 102 opens. Then, when a comparing means 104 decides that actual slip ratio Sb(n) is equal to or grater than a control termination slip ratio S2(n) stored in an S2 storage means 103, a VT reduction control means 105 is actuated and the switching means 54 is energized to give the output signal of the VT reduction control means 105 to the control data calculating means 55.

The VT reduction control means 105 executes steps S131 and S132 of FIG. 26 on the basis of the desired slip VT(n) corresponding to the VF(n) and read from the desired slip storage means 53, the $VT_{min}$ stored in the $VT_{min}$ storage means 106, and a predetermined value W to reduce the desired slip VT(n). A reduced desired slip VT(n) is given through the switching means 54 to the control data calculating means 55.

When the output signal of the VT reduction control means is given through the switching means 54 to the control data calculating means 55, a third switching control means 109 is actuated to execute steps S133 to S141 of FIG. 26. When an affirmative decision is made in step S137 of FIG. 26 by the third switching control means 109, the switching means 54 is reset in its initial state, the switching means 68 is driven to give an ignition angle $C\text{-}S\Theta_{ig(n)}$, i.e., the output signal of a transition control mode ignition angle calculating means 74, to the driver 69.

The transition control mode ignition angle calculating means 74 decreases the basic correction $\Delta\Theta_{ig}$, i.e., an ignition delay angle, by a predetermined angle L, and then calculates an ignition angle $C\text{-}S\Theta_{ig(n)}$ on the basis of a new $\Delta\Theta_{ig}$ and the $S\Theta_{ig(n)}$ stored in the ignition angle storage means 66 by using the expression (11).

When $\Delta\Theta_{ig}$ is diminished to zero, the transient control mode ignition angle calculating means 74 drives the switching means 68 to give $S\Theta_{ig(n)}$ stored in the ignition angle storage means 66 to the driver 69.

In a state where the switching means 54 gives the desired slip VT(n) stored in the desired slip storage means 53 to the control data calculating means 55, $C\Theta_{ig(n)}$ is given through the switching means 68 to the driver 69, a second switching control means 73 executes steps S101 to S109 of FIG. 23. When the second switching control means 73 makes an affirmative decision in step S105 of FIG. 23, the switching means 68 is driven so as to give an ignition angle $C$-$S\Theta_{ig(n)}$, i.e., an output signal of the transient control mode ignition angle calculating means 74, to the driver 69.

After the $C\Theta_{ig(n)}$ timer 101 has timed the predetermined time TB, a duty factor setting means 107 reads a duty factor corresponding to VF(n) from a table as shown in FIG. 31. A driver 108 controls the warning buzzer 29 according to the duty factor.

The cancellation switch 27 cancels a control mode in which the ignition coil 8 is controlled on the basis of the ignition angle $C\Theta_{ig(n)}$ calculated by the traction control mode ignition angle calculating means 67 or the ignition angle calculated by the transient control mode ignition angle calculating means 74. When the push button of the cancellation switch 27 is depressed, the switching means 68 gives only $S\Theta_{ig(n)}$ to the driver 69, and the driver 72 turns on the traction control cancellation pilot lamp 11. When the push button of the cancellation switch 27 is depressed again, a control mode using the ignition angle $C\Theta_{ig(n)}$ or $C$-$S\Theta_{ig(n)}$ is enabled and the driver 72 turns off the traction control cancellation pilot lamp 11.

A failure detecting means 201 examines the traction control system while the switching means 68 is set to select $C\Theta_{ig(n)}$ or $C$-$S\Theta_{ig(n)}$ to see if there is any failure in the traction control CPU of the ignition control ECU and to see if the sensors including the front wheel speed sensor 3 and the rear wheel speed sensor 4 are disconnected.

If any failure occurs in the traction control system, the switching means 68 is controlled so that a failure control mode ignition angle calculating means 202 gives an ignition angle $\Theta_{ig(n)}$ to the driver 69.

An $R\Theta_{igmax}$ storage means 204 stores a table as shown in FIG. 29. An $R\Theta_{igmax}$ corresponding to the engine speed Ne is given to the failure control mode ignition angle calculating means 202.

Either $C$-$S\Theta_{ig(n)}$ calculated by the transient control mode ignition angle calculating means 74 or calculated by the traction control mode ignition angle calculating means 67, selected by the switching means 68 is given through an OR gate 203 to the failure control mode ignition angle calculating means 202. The failure control mode ignition angle calculating means 202 carries out calculation in step S167 of FIG. 28 on the basis of the ignition angle given thereto, $R\Theta_{igmax}$ provided by the $R\Theta_{igmax}$ storage means 204, and $S\Theta_{ig(n)}$ stored in the ignition angle storage means 66, and gives a calculated ignition angle $\Theta_{ig}$ through the switching means 68 to the driver 69.

The output signal of a turn-off switch, not shown, is applied through an inverter 205 to one of the input terminals of an OR gate 209. Accordingly, when the push button of the turn-off switch is not depressed, the OR gate 206 is open.

Upon the detection of a failure, the failure detecting means 201 applies a signal "1" to the other input terminal of the OR gate 206 and the traction control failure LED 96. Therefore, when the push button of the turn-off switch is not depressed, the traction control failure pilot lamp 16 and the traction control failure LED 96 flicker. When the push button of the turn-off switch is depressed, the inverter provides an output signal of "0," so that the traction control failure pilot lamp 16 is turned off.

An S1 storage means 75 stores control starting slip ratio S1(n). The first switching control means 70 uses the control starting slip ratio S1(n) in making a decision.

Figure 35:
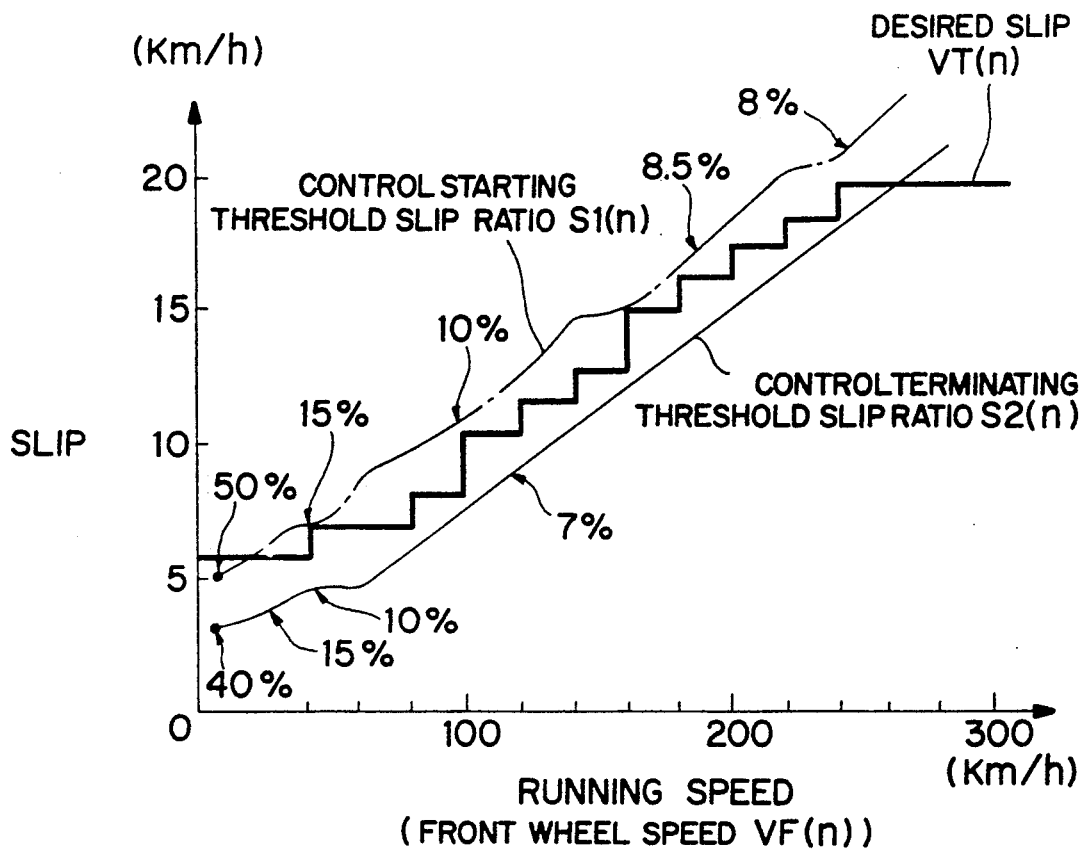
FIG. 35 is a graph showing desired slip VT(n) and slip ratios S1(n) and S2(n) as functions of running speed and slip.

FIG. 15 shows, by was of example, desired slip VT(n), control starting slip ratio S1(n) and control terminating slip ratio S2(n) as functions of running speed, front wheel speed VF(n), measured on the horizontal axis and wheel speed, rear wheel speed VR(n), measured on the vertical axis. FIG. 35 shows another example of the same. In FIG. 35, slip (the express (3)) is measured on the vertical axis. Values in percentage shown in FIG. 35 are actual values on lines indicating control starting slip ratio S1(n) and control terminating slip ratio S2(n).

Figure 36:
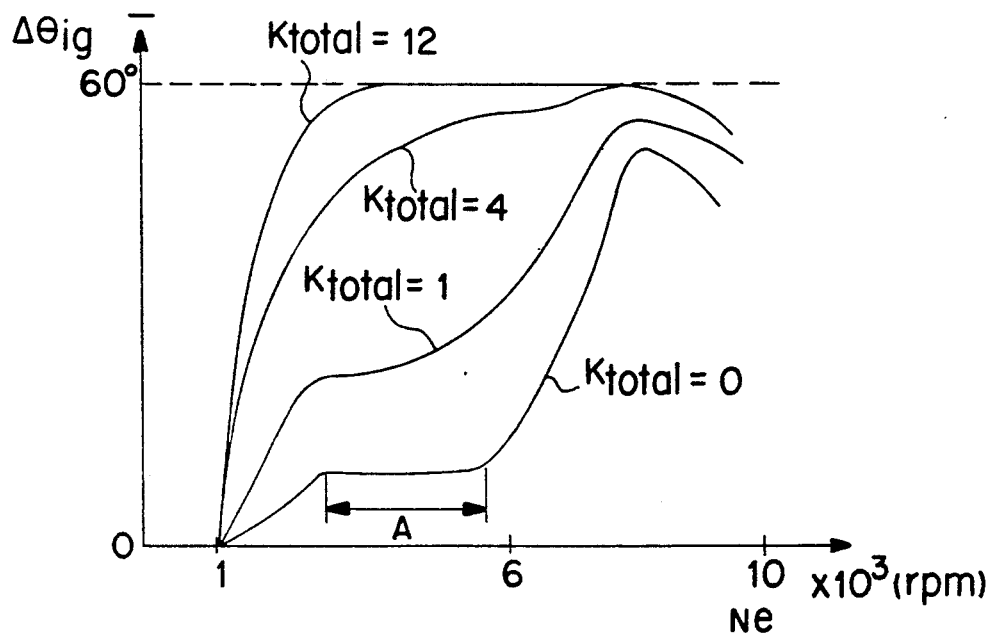
FIG. 36 is a graph, similar to FIG. 19, showing the relation between $\Delta\Theta_{ig}$ and the engine speed Ne.
Figure 37:
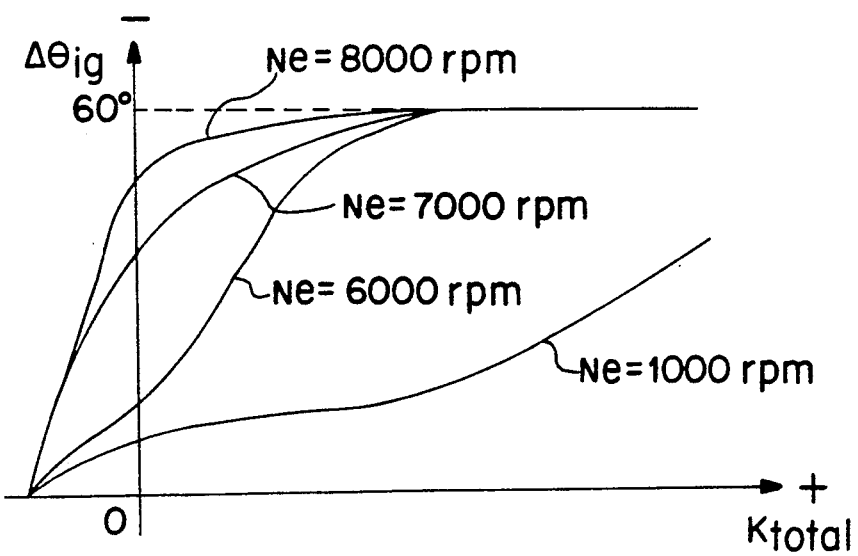
FIG. 37 is a graph, similar to FIG. 20, showing the relation between $\Delta\Theta_{ig}$ and $K_{total}$.

The map of basic correction $\Delta\Theta_{ig}$ shown in FIG. 18 is based on relations shown in FIGS. 19 and 20. Concretely, basic correction may be based on relations shown in FIGS. 36 and 37. In FIG. 36, the range of $K_{total}$ is from 0 to 12, because a maximum $K_{total}$ that can be calculated-by an electronic control circuit 305 (FIG. 6) is 30.

In a range A in FIG. 36 value of $\Delta\Theta_{ig}$ is held constant regardless of the increase of engine speed Ne, because it was found through experiments that the throttle valve is substantially fully opened for acceleration while the motorcycle is running on a road having a high friction coefficient ($\mu$) when $K_{total}$ is substantially zero and the engine speed is in the range A. Since increase in ignition delay angle is such a running condition affects adversely to full-throttle acceleration, increase in ignition delay angle is suppressed for satisfactory acceleration.

The failure control procedure shown in FIG. 28 (step S23 of FIG. 8) increases the current ignition delay angle gradually to $R\Theta_{igmax}$ read from the table of FIG. 29 in case the traction control system fails to operate properly during traction control operation and, consequently, the vehicle is not subjected to shocks. It is also possible to start decreasing the ignition delay angle gradually a predetermined time after the ignition delay angle has reached $R\Theta_{igmax}$, in addition to the foregoing procedure, so that the engine is ignited at the standard ignition angle. Naturally, the indication of failure of the traction control system is not cancelled.

Such a procedure is expressed by a flow chart in FIG. 38, in which steps like or corresponding to those shown in FIG. 28 are denoted by the same numbers and the description thereof will be omitted. In executing this procedure for the first cycle after failure has occurred, steps S162, S163 and S164 are execute sequentially, and $R\Theta_{igmax}$ is added to $S\Theta_{ig(n)}$ to determine ignition angle in step S167 when the current ignition delay angle (a negative value) is not greater than the delay angle $R\Theta_{igmax}$ (a negative value) read in step S161, namely, when the current delay angle is equal to $R\Theta_{igmax}$ or on the delay side with respect to $R\Theta_{igmax}$. If the ignition delay angle is greater than $R\Theta_{igmax}$, namely, if the ignition delay angle is on the advance side with respect to $R\Theta_{igmax}$, $R\Theta_{igmax}$ is set for an angle obtained by subtracting a predetermined angle M (a positive value) from the current ignition delay angle in step S166. Then, $R\Theta_{igmax}$ is added to $S\Theta_{ig(n)}$ to obtain the ignition angle $\Theta_{ig(n)}$.

In executing this procedure for the second and subsequent cycles after failure has occurred, step S169 is executed after step S162. In step S169, a query is made to see if $R\Theta_{ig(n)}$ read and used as $R\Theta_{igmax}$ in the last cycle, i.e., $R\Theta_{ig(n-1)}$ is not greater than $R\Theta_{igmax}$ (on the delay side with respect to $R\Theta_{igmax}$) read in step S161 in this cycle. If the response in step S169 is negative (if $R\Theta_{ig(n-1)}$ is on the advance side with respect to $R\Theta_{igmax}$), an angle obtained by subtracting the determined angle M from $R\Theta_{ig(n-1)}$ is set $R\Theta_{igmax}$ in step 170, and then ignition angle $\Theta_{ig(n)}$ is calculated in step S167. If the response in step S169 is affirmative, (if $R\Theta_{ig(n-1)}$ is on the delay side with respect to $R\Theta_{igmax}$), step S201 and the following steps are executed.

As illustrated in FIG. 38, in step S201, a query is made to see if an $R\Theta_{igmax}$ counter (or a timer) is in counting operation. Since the $R\Theta_{igmax}$ counter is not in counting operation when step S201 is executed in the first cycle, step S202 is executed to start the $R\Theta_{igmax}$-counter.

In step S203, a query is made to see if the $R\Theta_{igmax}$ counter has counted three seconds. When the response in step S203 is negative, step S167 is executed to add $R\Theta_{igmax}$ read in step S161 to $S\Theta_{ig(n)}$ to determine ignition angle $\Theta_{ig(n)}$.

When the response in step S203 is affirmative, an angle obtained by adding the predetermined angle M to $R\Theta_{ig(n-1)}$ is set as $R\Theta_{igmax}$. That is, $R\Theta_{ig(n-1)}$ is correct to advance the ignition angle by the angle M with respect to $R\Theta_{igmax}$, which is reverse to step S170.

In step S205, a query is made to see if $R\Theta_{igmax}$ is equal to or greater than zero, namely, if $R\Theta_{igmax}$ is not a negative angle for delay ignition time. When the response in step S205 is negative, $R\Theta_{igmax}$ determined in Step S204 is used for determining an ignition angle $\Theta_{ig(n)}$ in step S167. When the response in step S205 is affirmative, $R\Theta_{igmax}$ is set for zero in step S206, the first failure flag is set to the 1 state in step S207, and then step S167 is executed.

Thus, the response in step S20B in FIG. 8 is affirmative, and then the standard ignition angle $S\Theta_{ig(n)}$ is selected as ignition angle $\Theta_{ig(n)}$ in step S27 without executing the failure mode control.

Figure 39:
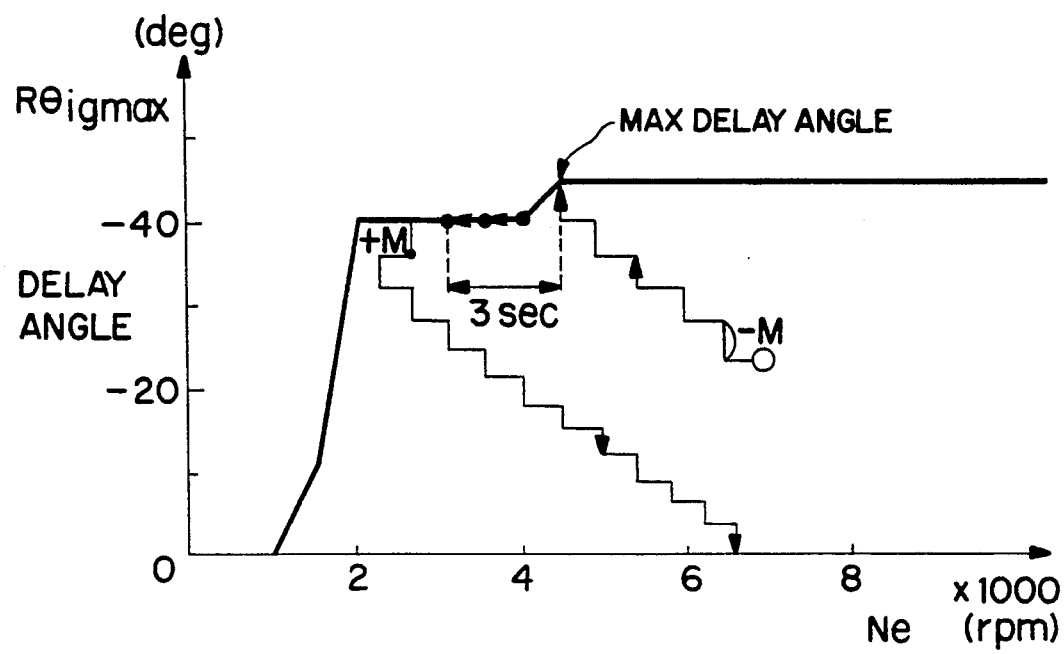
FIG. 39 is a graph, similar to FIG. 29, showing the relation between $R\Theta_{igmax}$ read in step S161 and engine speed Ne.

A table indicated by a thick line in FIG. 39 may be used instead of the table shown in FIG. 29 for reading $R\Theta_{igmax}$ in step S161 in FIG. 28 or FIG. 38. In FIG. 39, the variation of the delay angle (an actual delay angle used for determining the ignition angle $\Theta_{ig(n)}$) added to $S\Theta_{ig(n)}$ in step S167 in FIG. 38 by the procedure shown in FIG. 38 is indicated by a fine line. Although the delay angle is $R\Theta_{igmax}$ expressed by the expression (12), this $R\Theta_{igmax}$ is not equal to $R\Theta_{igmax}$ read in step S161 (value indicated by the thick line in FIG. 39). That is, $R\Theta_{igmax}$ read in step S161 is the maximum delay angle for failure mode control, whereas $R\Theta_{igmax}$ added to the standard ignition angle $S\Theta_{ig(n)}$ is an actual delay angle for failure mode control.

The actual delay angle shown in FIG. 39 indicates change when failure occurred at a point indicated by a blank circle. As is obvious from FIG. 39, when failure occurs, the actual delay angle is increased (decreased in value) in steps by the angle M at a time by steps S166 and S170 and reaches $R\Theta_{igmax}$. $R\Theta_{igmax}$ is maintained for three seconds in step S203, and then the actual delay angle is decreased (increased in value) in steps by the angle M at a time in step S204 to zero. The delay angle is held at zero for running.

Figure 40:
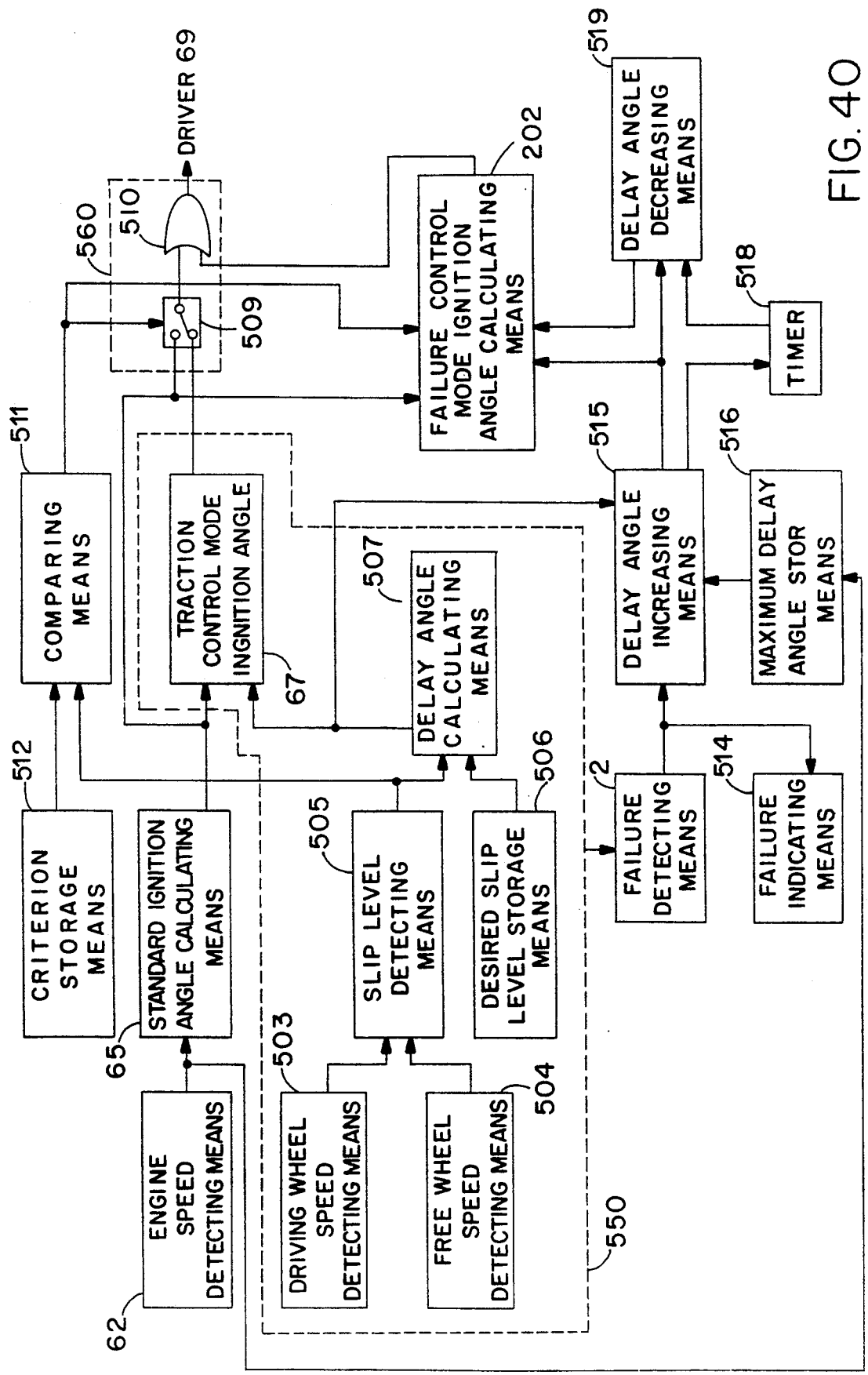
FIG. 40 is a block diagram showing the functions of the present invention.

FIG. 40 is a block diagram showing the functions of the present invention, in which parts like or corresponding to those shown in FIGS. 1, 2 and 34 are denoted by the same reference characters. Indicated at 550 is the principal functions of the traction control CPU 305B, the front wheel speed sensor 3 and the rear wheel speed sensor 4 (FIG. 6).

A driving wheel speed detected by a driving wheel speed detecting means 503 and a free wheel speed detected by a free wheel speed detecting means 504 are given to a slip level detecting means 505, and then the slip level detecting means 505 determines a slip level (a slip or a slip ratio).

A delay angle calculating means 507 calculates an ignition delay angle corresponding to the detected slip level and a desired slip level stored in a desired slip level storage means 506.

A stand ignition angle calculating means 65 calculates a standard ignition angle corresponding to an engine speed provided by the engine speed detecting means 62. The standard ignition angle and the delay angle are given to the traction control mode ignition angle calculating means 67, and then the traction control mode ignition angle calculating means 67 calculates a traction control mode ignition angle on the basis of the input data.

A comparing means 511 compares the detected slip level with a criterion stored in a criterion storage means 512 and controls a switching means 509 according to the result of comparison. The standard ignition angle or the traction control mode ignition angle provided through the switching means 509 is transferred through an OR gate 510 to the driver 69 (FIGS. 6 and 34).

The failure detecting means 201 the failure of the traction control mode ignition angle calculating means 67 in calculating the traction control mode ignition angle. The failure of the traction control mode ignition angle calculating means 67 is indicated by a failure indicating means 514, and a delay angle increasing means 515 increases gradually the delay angle provided by a delay angle calculating means 507 until the delay angle is increased to a maximum delay angle stored in a maximum delay angle storage means 516. The maximum delay angle storage means 516 corresponds to the table shown in FIG. 29 or FIG. 39, and the maximum delay angle corresponds to $R\Theta_{igmax}$.

When a signal requiring the selection of the output signal of the traction control mode ignition angle calculating means is given from the comparing means 511 to the switching means 509, the failure control mode ignition angle calculating means 202 adds the delay angle provided by the delay angle increasing means 515 to the standard ignition angle provided by the standard ignition angle calculating means 65 to provide a failure control mode ignition angle, and gives the failure control mode ignition angle to the OR gate 510.

When the delay angle is increased to the maximum delay angle by the delay angle increasing means 515, a timer 518 is started to time a predetermined time, for example three seconds. Upon the elapse of the predetermined time, a delay angle decreasing means 519 decreases the delay angle gradually to zero. The failure control mode ignition angle calculating means 202 uses the gradually decreasing delay angle to calculate failure control mode ignition angle. An ignition control means 560 selects an ignition angle.

Although subtraction correction Z has been considered in the foregoing description to be a variable varying according to the running speed of the motorcycle, the same may be a constant independent of the running speed.

Although the foregoing procedure calculates the gear ratio R by using the expression (9), gear ratio R may be a fixed value corresponding to a gear position of the transmission when the transmission is a manual transmission.

Tables for $VT(n)$, $\Delta\Theta_{ig}$, $Z$, $R\Theta_{igmax}$ and $Kg$ may be those other than those shown in the drawings. The tables may be determined taking into consideration the running characteristics of the vehicle.

Values of other coefficients are not limited to those used in the foregoing description.

Although the invention has been described as applied to a traction control system which delays ignition timing for traction control, the present invention may be applied to a traction control system which controls the opening of the throttle valve for traction control.

Figure 33:
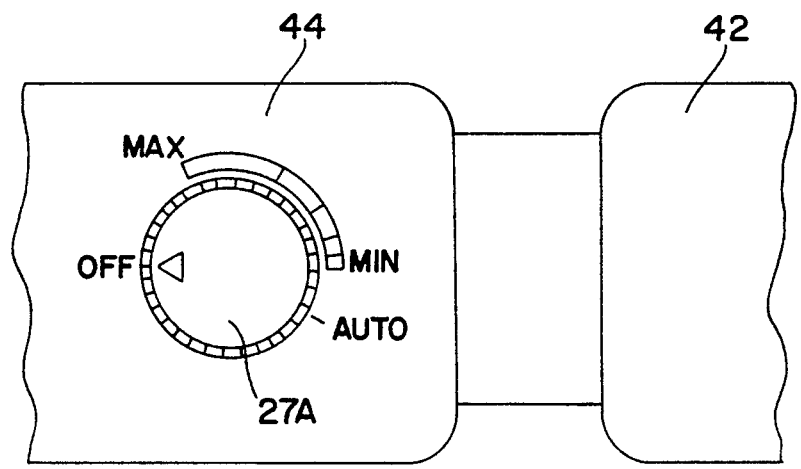
FIG. 33 is a plan view of another cancellation switch.

Furthermore, the push-button on/off type cancellation switch 27 employed in the foregoing embodiment may be substituted by a rotary switch 27A as shown in FIG. 33. The rotary switch 27A has an OFF position to cancel the traction control operation and to use only $S\Theta_{ig(n)}$ for ignition timing control, a range MAX-MIN to enable the driver to select an optional ignition delay angle determined by using $\Delta\Theta_{ig(n)}$ and Z, and an AUTO position enable the traction control system to set the variables automatically according to road condition and the degree of wear of the tires.

Although the present invention has been described as applied to a motorcycle, naturally, the present invention is applicable also to automobiles and the like.

The automotive traction control system of the present invention increases ignition delay angle gradually, namely, delays ignition timing gradually, when failure occurs in the traction control unit during traction control operation to reduce the running speed of the vehicle gradually regardless of the opening of the throttle valve. Accordingly, the vehicle is not subjected to shocks attributable to the change of control mode when failure occurs in the traction control unit.

The automotive traction control system of the present invention reduces the running speed of the vehicle and informs the driver of failure by the failure indicating means when failure occurs in the traction control unit. Accordingly, the driver is able to surely recognize the failure.

Generally, ignition angle is dependent on engine speed, and hence the engine is unable to operate properly if ignition timing is delayed regardless of engine speed.

The automotive traction control system according to the present invention limits the increase of ignition delay angle to a maximum delay angle corresponding to engine speed, so that the performance of the engine is not deteriorated and the running speed can satisfactorily be reduced under any running condition.

The automotive traction control system according to the present invention decreases delay angle after delay angle has been increased to the maximum delay angle. Accordingly, the normal running mode of the vehicle can be restored after making the driver recognize the failure of the traction control unit by bodily sensation. Thus, the driver is able to control the vehicle for normal running after recognizing the failure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automotive traction control system comprising:
    driving wheel speed detecting means for detecting the speed of a driving wheel;
    free wheel speed detecting means for detecting the speed of a free wheel;
    slip level detecting means for detecting the slip level of the vehicle on the basis of the speed of the driving wheel and the speed of the free wheel;
    standard ignition angle calculating means for calculating a standard ignition time according to engine speed;
    ignition delay angle calculating means for calculating an ignition delay angle for ignition timing on the basis of at least the engine speed and the slip of the vehicle;
    traction control mode ignition angle calculating means for calculating a traction control mode ignition angle for controlling traction on the basis of the standard ignition angle and the ignition delay angle; and
    ignition control means for selecting the traction control mode ignition angle instead of the standard ignition angle when the slip level of the vehicle exceeds a predetermined criterional level;
    the improvement comprising:
        failure detecting means for detecting the failure of the traction control ignition angle calculating means;
        ignition delay angle increasing means for gradually increasing the ignition delay angle calculated by the ignition delay angle calculating means to further delay the ignition timing when the failure detecting means detects the failure of the traction control mode ignition angle calculating means while the ignition timing is controlled according to the traction control mode ignition angle; and
        failure control mode ignition angle calculating means for calculating a failure control mode ignition angle on the basis of the increased ignition delay angle provided by the ignition delay angle increasing means;
    wherein the ignition control means selects the failure control mode ignition angle when the failure detecting means detects the failure of the traction control mode ignition angle calculating means.

2. The automotive traction control system according to claim further comprising failure display means actuated when the failure detecting means detects the failure of the traction control mode ignition angle.

3. The automotive traction control system according to claim 1, wherein the ignition delay angle increasing means increases the ignition delay angle calculated by the ignition delay angle calculating means to a maximum ignition delay angle corresponding to the engine speed.

4. The automotive traction control system according to claim 2, wherein the ignition delay angle increasing means increases the ignition delay angle calculated by the ignition delay angle calculating means to a maximum ignition delay angle corresponding to the engine speed.

5. The automotive traction control system according claim 3, further comprising ignition delay angle decreasing means for gradually decreasing the ignition delay angle to advance the ignition timing after the ignition delay angle has been increased to the maximum ignition delay angle by the ignition delay angle increasing means.

6. An automotive traction control system comprising:
   driving wheel speed detecting means for detecting the speed of a driving wheel;
   free wheel speed detecting means for detecting the speed of a free wheel;
   slip level detecting means for detecting the slip level of the vehicle on the basis of the speed of the driving wheel and the speed of the free wheel;
   standard ignition angle calculating means for calculating a standard ignition time according to engine speed;
   ignition delay angle calculating means for calculating an ignition delay angle for ignition timing on the basis of at least the engine speed and the slip of the vehicle;
   traction control mode ignition angle calculating means for calculating a traction control mode ignition angle for controlling traction on the basis of the standard ignition angle and the ignition delay angle; and
   ignition control means for selecting the traction control mode ignition angle instead of the standard ignition angle when the slip level of the vehicle exceeds a predetermined criterional level;
   the improvement comprising:
      failure detecting means for detecting the failure of the traction control ignition angle calculating means;
      ignition delay angle increasing means for gradually increasing the ignition delay angle calculated by the ignition delay angle calculating means as compared to a predetermined value to further delay the ignition timing when the failure detecting means detects the failure of the traction control mode ignition angle calculating means while the ignition timing is controlled according to the traction control mode ignition angle for avoiding shock to the vehicle operation; and
      failure control mode ignition angle calculating means for calculating a failure control mode ignition angle on the basis of the increased ignition delay angle provided by the ignition delay angle increasing means;
   wherein the ignition control means selects the failure control mode ignition angle when the failure detecting means detects the failure of the traction control mode ignition angle calculating means.

7. The automotive traction control system according to claim 6, further comprising failure display means actuated when the failure detecting means detects the failure of the traction control mode ignition angle.

8. The automotive traction control system according to claim 6, wherein the ignition delay angle increasing means increases the ignition delay angle calculated by the ignition delay angle calculating means to a maximum ignition delay angle corresponding to the engine speed.

9. The automotive traction control system according to claim 7, wherein the ignition delay angle increasing means increases the ignition delay angle calculated by the ignition delay angle calculating means to a maximum ignition delay angle corresponding to the engine speed.

10. The automotive traction control system according to claim 8, further comprising ignition delay angle decreasing means for gradually decreasing the ignition delay angle to advance the ignition timing after the ignition delay angle has been increased to the maximum ignition delay angle by the ignition delay angle increasing means.

* * * * *